(12) United States Patent
Yin et al.

(10) Patent No.: US 12,625,415 B2
(45) Date of Patent: May 12, 2026

(54) TERMINAL DEVICE, CAMERA AND PHOTOGRAPHING APPARATUS

(71) Applicant: BEIJING XIAOMI MOBILE SOFTWARE CO., LTD., Beijing (CN)

(72) Inventors: Zhidong Yin, Beijing (CN); Jie Meng, Beijing (CN); Xinhui Duan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 300 days.

(21) Appl. No.: 18/371,375

(22) Filed: Sep. 21, 2023

(65) Prior Publication Data
US 2024/0402576 A1 Dec. 5, 2024

(30) Foreign Application Priority Data
May 31, 2023 (CN) .......................... 202310640224.8

(51) Int. Cl.
*G03B 17/17* (2021.01)
*G03B 9/02* (2021.01)
(52) U.S. Cl.
CPC .............. *G03B 17/17* (2013.01); *G03B 9/02* (2013.01)
(58) Field of Classification Search
CPC ...... G03B 17/17; G03B 9/02; G02B 13/0065; G02B 13/0045
USPC ........................................................ 359/737
See application file for complete search history.

(56) References Cited

U.S. PATENT DOCUMENTS

2020/0409050 A1  12/2020 Chen et al.
2021/0364738 A1* 11/2021 Huang ............... G02B 13/0065
2022/0035125 A1*  2/2022 Yang ......................... G02B 3/04
2022/0035131 A1*  2/2022 Ke .......................... G02B 13/02
2022/0206273 A1*  6/2022 Li ........................... G02B 13/02
2024/0231044 A1*  7/2024 Lin .......................... G02B 9/64

FOREIGN PATENT DOCUMENTS

CN        115220195 A    10/2022
EP         3444650 A1    2/2019

OTHER PUBLICATIONS

Extended European Search Report issued in EP application No. 23203128.6 dated Apr. 4, 2024, (9p).

* cited by examiner

*Primary Examiner* — Stephone B Allen
*Assistant Examiner* — Boutsikaris Leonidas
(74) *Attorney, Agent, or Firm* — Arch & Lake LLP; Hao Tan; Shen Wang

(57) ABSTRACT

A terminal device, a camera, and a photographing apparatus are provided. The terminal device includes a first board and a first camera; the first board includes a light-transmitting area; the first camera includes a prism, a lens group, and a photosensitive element, the prism includes an object side and an image side, light transmitting through the light-transmitting area sequentially pass through the object side of the prism, the image side of the prism, and the lens group to irradiate onto the photosensitive element, a field of view of the light that the photosensitive element can receive is within a preset value range, and an optical axis of the lens group is not parallel to a vertical line of the light-transmitting area; and the preset value range is greater than or equal to 55°.

18 Claims, 9 Drawing Sheets

023

0221  0222  0223 0224  0225 0226  0227  0228

022

Curvature of field                    Distortion

Focal point（mm）              Distortion（%）

023

0221 0222 0223 0224 0225 0226 0227 0228

022

Curvature of field                    Distortion

Focal point (mm)                    Distortion (%)

Curvature of field

Distortion

Focal point （mm）          Distortion （%）

TERMINAL DEVICE, CAMERA AND PHOTOGRAPHING APPARATUS

CROSS REFERENCE

The present disclosure is filed based upon and claims priority to Chinese Application No. 202310640224.8 filed on May 31, 2023, the contents of which are incorporated herein by reference in their entireties for all purposes.

TECHNICAL FIELD

The present disclosure relates to the technical field of optical imaging, and in particular to a terminal device, a camera and a photographing apparatus.

BACKGROUND

Nowadays, portable terminal devices have gradually tended to be miniaturized. At the same time, each brand chooses to upgrade the photographing performance of the terminal device to enhance the competitiveness of the product.

At present, in order to ensure better photographing performance of the terminal device, it is usually necessary to configure a large number of lenses in the camera of the terminal device, and multiple optical elements are stacked in the thickness direction of the terminal, resulting in a relatively large size of the terminal in the thickness direction, which is not conducive to the miniaturization of photographing apparatus.

SUMMARY

Embodiments of the present disclosure provide a terminal device, a camera, and a photographing apparatus. The technical solution is as follows:

In a first aspect, the present disclosure provides a terminal device, where the terminal device includes a first board and a first camera;

the first board includes a light-transmitting area;

the first camera includes a prism, a lens group, and a photosensitive element, the prism includes an object side and an image side, light transmitting through the light-transmitting area sequentially pass through the object side of the prism, the image side of the prism, and the lens group to irradiate onto the photosensitive element, a field of view of the light that the photosensitive element receives is within a preset value range, and an optical axis of the lens group is not parallel to a vertical line of the light-transmitting area; and the preset value range is greater than or equal to 55°.

In a second aspect, the present disclosure provides a camera, where the camera includes a prism, a lens group and a photosensitive element;

the prism includes an object side and an image side;

light transmitting through the prism sequentially pass through the object side of the prism, the image side of the prism, and the lens group to irradiate onto the photosensitive element, a field of view of the light that the photosensitive element receives is within a preset value range, and an optical axis of the lens group is not parallel to an optical axis of the object side of the prism; and the preset value range is greater than or equal to 55°.

In a third aspect, the embodiment of the present disclosure provides a photographing apparatus including the camera according to the second aspect and the implementations thereof.

It is to be understood that both the foregoing general description and the following detailed description are exemplary and explanatory only and are not restrictive of the disclosure.

BRIEF DESCRIPTION OF THE DRAWINGS

In order to more clearly illustrate the technical solutions in the embodiments of the present disclosure, the drawings that need to be used in the description of the embodiments will be briefly introduced below. Obviously, the drawings in the following description are only some embodiments of the present disclosure. For those skilled in the art, other drawings can also be obtained based on these drawings without creative effort.

DETAILED DESCRIPTION

In order to make the purpose, technical solution and advantages of the present disclosure clearer, the implementation manners of the present disclosure will be further described in detail below in conjunction with the accompanying drawings.

Unless otherwise defined, the technical terms or scientific terms used herein shall have the usual meanings understood by those having ordinary skill in the art to which the present disclosure belongs. The "first," "second," "third" and similar words used in the patent disclosure and claims of this disclosure do not indicate any order, quantity or importance, but are only used to distinguish different components. Likewise, words like "a" or "an" do not indicate a limitation of quantity, but mean that there is at least one. Words such as "comprises" or "include" and similar terms mean that the elements or items listed before the "comprises" or "include" comprise the elements or items and their equivalents listed after the "comprises" or "include," while do not exclude other component or object. Words such as "connected" or "linked" are not limited to physical or mechanical connections, but may include electrical connections, whether direct or indirect. The "up," "down,", "left," "right" and so on are only used to indicate the relative positional relationship. When the absolute position of the described object changes, the relative positional relationship may also change accordingly.

An embodiment of the present disclosure provides a terminal device, and the terminal device may be a portable terminal device such as a smart phone or a tablet computer. In the following, each component is introduced by taking the terminal device as an example of a smart phone.

Figure 1:
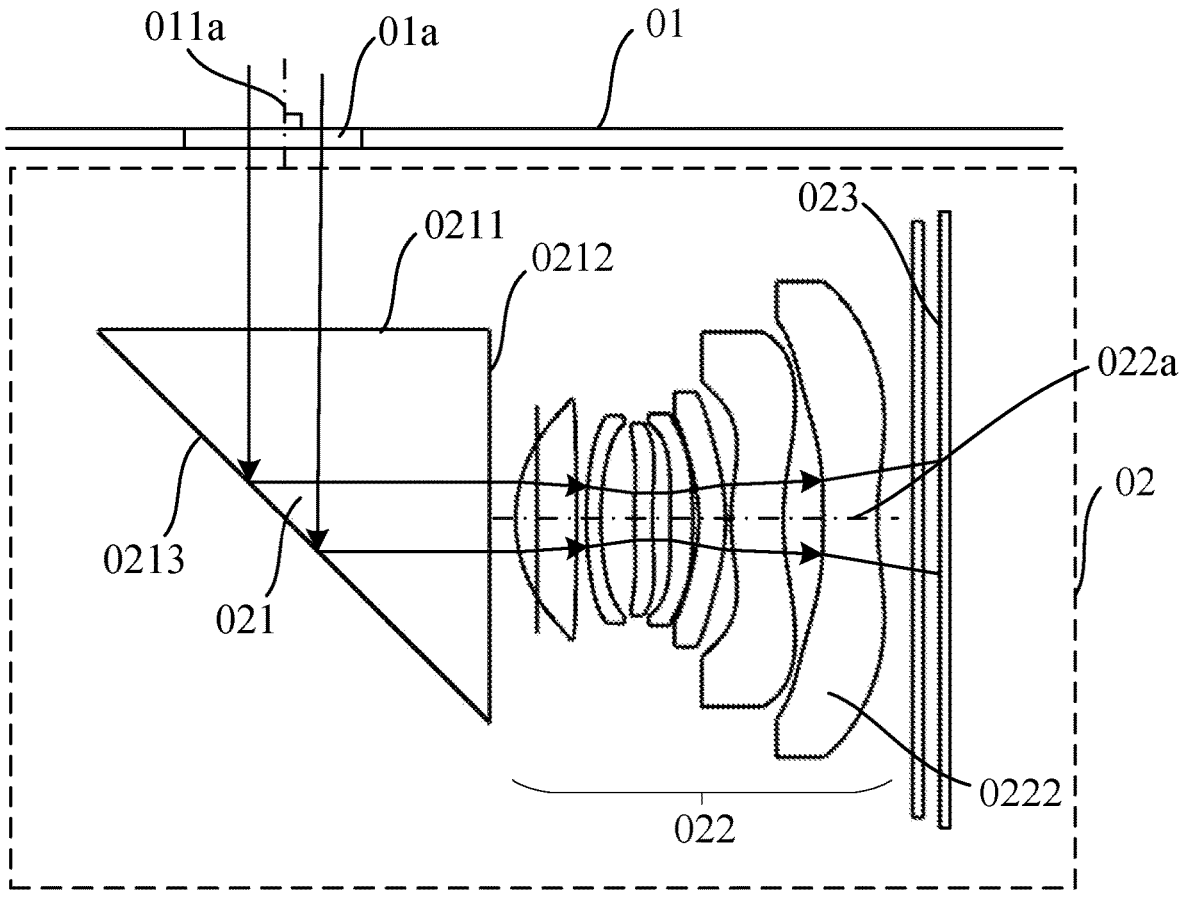
FIG. 1 is a schematic structural diagram of a terminal device illustrated in an embodiment of the present disclosure.

As shown in FIG. 1, the terminal device includes a first board 01 and a first camera 02.

Alternatively, the first camera 02 may be a rear camera of the terminal device, or may be a front camera of the terminal device. For example, in the case where the first camera 02 is the rear camera in the terminal device, the first board body 01 may be the backplane of the terminal device (that is, the board structure arranged on the side of the terminal device opposite to the display surface of the display panel, which is a part of the external structure of the terminal device), the backplane at least partly has light-transmitting property. In the case where the first camera 02 is the front camera in the terminal device, the first board 01 may be a screen cover in the terminal device (the screen cover is arranged above the display panel as part of the external structure of the terminal device), and the screen cover has light-transmitting property.

As shown in FIG. 1, the first board 01 has a light-transmitting area 01a.

For example, the light-transmitting area 01a may include a light-through hole penetrating the first board 01; for example, the light-through hole may be a circular through-hole, or the light-through hole may be a square through-hole.

For example, the first board body 01 may be a backplane of a terminal device, and the light-transmitting region 01a may be directly formed on the backplane; wherein the backplane may be a glass substrate or part of the backplane may be a glass substrate. Alternatively, for example, the first board body 01 may be a backplane of a terminal device, a protruding part is provided on the backplane, and the light-transmitting area 01a is at least partially formed on the protruding part. For example, a covering with light-transmitting characteristic is formed on the protruding part, and the covering forms the light-transmitting region 01a. For another example, a covering with light-transmitting properties is formed on the protruding part and a through hole is formed in the protruding part, and the covering and the through hole form the light-transmitting region 01a. In the embodiment, for example, the covering may be a glass substrate.

Alternatively, the first board 01 may have a rectangular plate-like structure, the light-through hole is a circular through hole, and an axis of the light-through hole is perpendicular to the first board 01.

In this way, the processing difficulty of the light-through hole can be reduced, and at the same time, the difficulty of assembling between the first board body 01 and the first camera 02 can be reduced.

As shown in FIG. 1, the first camera 02 includes a prism 021, a lens group 022 and a photosensitive element 023. The photosensitive element may, for example, a photosensitive sensor. The prism 021 has an object side 0211 and an image side 0212. The light transmitted through the light-transmitting area 01a sequentially passes through the object side 0211 of the prism 021, the image side 0212 of the prism 021, and the lens group 022 to irradiate the photosensitive element 023. During this process, the prism 021 is used to change the propagation direction of light transmitted through the light-transmitting region 01a.

The light that can be received by the photosensitive element 023 is within a field of view in a preset value range, and the preset value range is greater than or equal to 55°. That is, the field of view angle of the first camera 02 is greater than or equal to 55°. According to FIG. 1, it is easy to see that the light received by the photosensitive element 023 is the light sequentially transmitted through the light-transmitting area 01a, the object side 0211 of the prism 021, the image side 0212 of the prism 021 and the lens group 022.

In this way, when using the camera 02, it can have a larger field of view, which improves the user's experience of using the terminal device.

The prism 021 has an object side 0211, an image side 0212 and a reflecting side 0213. The object side 0211 of the prism 021 is located in the light exiting direction of the light-transmitting region 01a, that is, the axis of the light-through hole passes through the object side 0211 of the prism 021.

The object side 0211 of the prism 021 can be arranged in alignment, and the geometric center point of the object side 0211 of the prism 021 can be on the axis of the light-through hole.

In some alternative implementations, in order to ensure that the prism 021 can completely reflect the light transmitted through the light-transmitting region 01a, the projection of the light-through hole on the object side 0211 of the prism 021 along its axial direction can be completely positioned within the outer contour of the object side 0211 of the prism 021.

In some examples, as shown in FIG. 1, the prism 021 may have a triangular prism structure. The top and bottom surfaces of the triangular prism structure may be both isosceles right triangles and parallel to each other, and the three side walls are all perpendicular to the top surface. The side walls where the two right-angle sides of the top surface are located are the object side 0211 and the image side 0212 of the prism 021 respectively, and the side where the hypotenuse of the top surface is located is the reflecting side 0213 of the prism 021.

As shown in FIG. 1, the lens group 022 and the photosensitive element 023 are sequentially arranged in the light exiting direction of the image side 0212 of the prism 021.

The object side 0211 of the prism 021 can be arranged parallel to the first board 01, the axis of the light-transmitting area 01a is perpendicular to the object side 0211 of the prism 021, and the angel between the reflecting side 0213 of the prism 021 and the first board 01 can be configured to be 45°.

In some alternative implementations, referring to FIG. 1, when the light is incident perpendicular to the first board 01, the light beam transmitted through the light-transmitting area 01a is perpendicularly incident on the object side 0211 of the prism 021, and the reflecting side 0213 of the prism 021 reflects the incident light beam, and the light beam reflected by the reflecting side 0213 of the prism 021 is transmitted through the image side 0212 of the prism 021 along the direction parallel to the first board 01, and the lens group 022 is arranged sequentially on the light emitting direction of the image side 0212 of the prism 021, and the light beams are sequentially transmitted through the lens group 022 and received by the photosensitive element 023. After the photosensitive element 023 receives the light beam, it can process the light beam to obtain an image.

As shown in FIG. 1, the optical axis 022a of the lens group 022 is not parallel to the vertical line 011a of the light-transmitting region 1a.

In practice, when the optical axis 022a of the lens group 022 is parallel to the vertical line 011a of the light-transmitting area 1a, the lens group 022 is parallel to the first board 01, and the first board 01 is the backplane or screen cover of the terminal device. That is to say, the optical axis direction of the lens group 022 is the thickness direction of the terminal device. When the number of the lens 022 is large resulting in a relatively large size of the lens group 022 in the optical axis direction, it will cause the terminal device to have a relatively large size in the thickness direction, which is not conducive to the miniaturization design of the terminal device. While when the optical axis 022a of the lens group 022 is not parallel to the vertical line 011a of the light-transmitting area 1a, the size of the lens group 022 in the thickness direction of the terminal device is equal to the component on the vertical line of the first board 01 of the size of the lens group 022 in the direction of the optical axis, which is smaller than the size of the lens group 022 in the direction of the optical axis. Therefore, by configuring the optical axis 022a of the lens group 022 and the vertical line 011a of the light-transmitting area 1a to be non-parallel, it can reduce the size of the terminal device in the thickness direction to a certain extent, which is beneficial to the miniaturization design of the terminal device.

In some examples, as shown in FIG. 1, the optical axis 022a of the lens group 022 may be perpendicular to the vertical line 011a of the light-transmitting region 01a.

In this way, since the optical axis 022a of the lens group 022 is perpendicular to the first board 01, when the size of the lens group 022 in the direction of the optical axis increases, the component on the vertical line of the first board 01 of the increase in the size of the lens group 022 in the direction of the optical axis is zero, and the size of the lens group 022 in the thickness direction of the terminal device only depends on the size of the lens 022 perpendicular to the optical axis. When the number of lenses 022 is relatively large, the size of the terminal device in the thickness direction can be significantly reduced, which is beneficial to the miniaturization design of the terminal device.

Alternatively, the first camera 02 may also include a diaphragm 024.

The diaphragm 024 is located between the lens group 022 and the image side 0212 of the prism 021, that is, the diaphragm 024 is located on the side of the first lens 0221 close to the image side 0212 of the prism 021. Wherein, the first lens 0221 is the lens closest to the image side 0212 of the prism 021 in the lens group 022.

The diaphragm 024 has a ring structure, and the clear aperture of the diaphragm 024 is D, and the value of D can be set according to actual needs.

In the terminal device, the aperture coefficient F of the first camera 02 satisfies 1.0<F<1.95.

In the embodiment, the aperture coefficient F is the ratio of the focal length f of the lens group 022 to the clear aperture D of the diaphragm 024.

In practice, when the relative positions of the lens group 022 and the diaphragm 024 remain unchanged, the larger the clear aperture D of the diaphragm 024 is, the larger the size of the corresponding prism 021 in the thickness direction of the terminal device is, the greater the amount of light entering the photosensitive element 023 passing through the diaphragm 024 is, and the better the imaging quality is. Correspondingly, when the relative position of the lens group 022 and the diaphragm 024 remains unchanged, the smaller the clear aperture D of the diaphragm 024 is, the smaller the size of the corresponding prism 021 in the terminal thickness direction is, the smaller the amount of light entering the photosensitive element 023 passing through the diaphragm 024 is, and the poorer the imaging quality is. Accordingly, technicians can configure the aperture coefficient of the camera according to actual needs, so as to balance the imaging quality of the camera and the size of the camera in the thickness direction of the terminal.

According to the experimental data results, it can be seen that when the aperture factor F of the camera satisfies 1.0<F<1.95, the imaging quality of the camera meets the requirements, and at the same time, the size of the camera in the thickness direction of the terminal can be greatly reduced, to adapt to the miniaturization trend of the portable terminal.

In some examples, the actual value of the aperture factor F of the camera may be 1.61.

The diaphragm 024 is located between the image side 0212 and the lens group 022, and there is a first distance T1 between the diaphragm 024 and the lens group 022.

Figure 2:
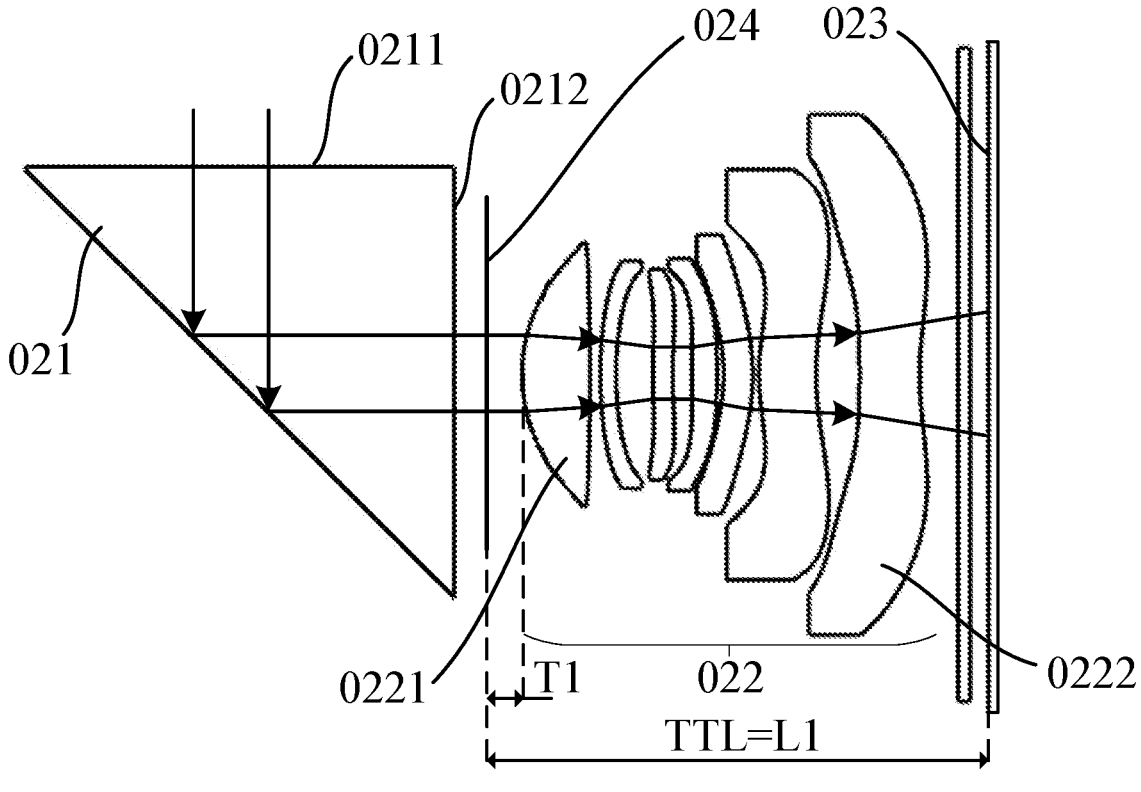
FIG. 2 is a schematic structural diagram of a camera illustrated in an embodiment of the present disclosure.

In one example, as shown in FIG. 2, the diaphragm 024 is located on the side of the first lens 0221 close to the image side 0212 of the prism 021, the diaphragm 024 and the first lens 0221 have a first distance T1, and T1>0.

Figure 10A:
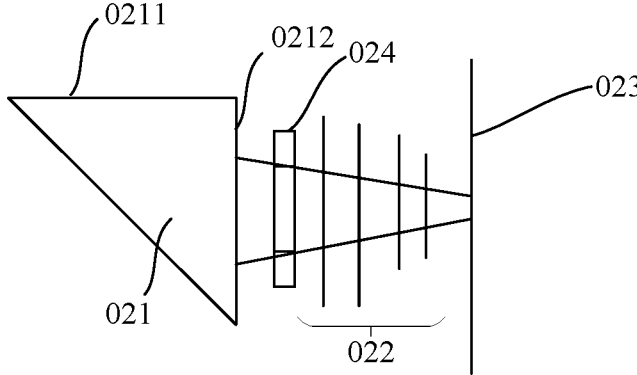
FIG. 10A is a schematic structural diagram of a camera illustrated in an embodiment of the present disclosure.
Figure 10B:
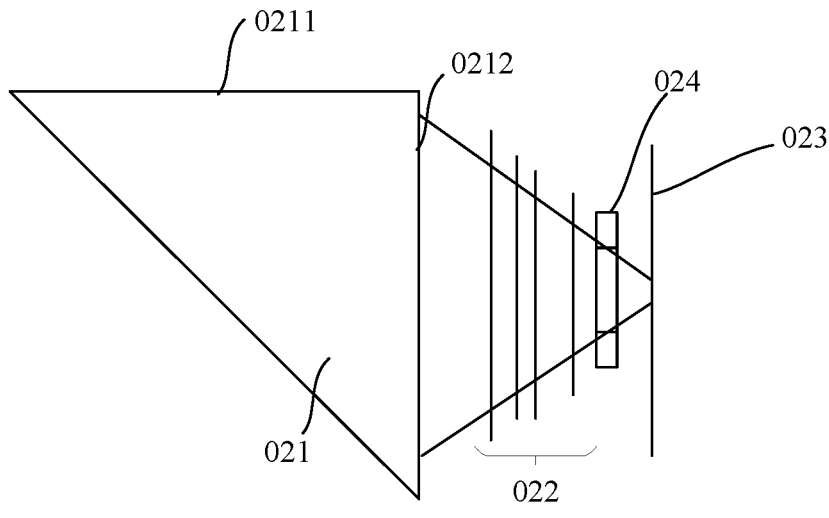
FIG. 10B is a schematic structural diagram of a camera illustrated in an embodiment of the present disclosure.

Referring to FIG. 10A and FIG. 10B, when the distance from the photosensitive element 023 to the prism 021 and the clear aperture D of the diaphragm 024 are equal, compared with the structure in which the diaphragm 024 is disposed on the side of the lens group 022 away from the object side 0211 of the prism 021, in the structure in which the diaphragm 024 is disposed on the side of the lens group 022 close to the image side 0212 of the prism 021, the required height of the prism 021 (i.e., the size of the prism 021 in the thickness direction of the terminal) can be effectively reduced. It is not difficult to see that in the case where the clear aperture D of the diaphragm 024 does not change, and the diaphragm 024 is between the photosensitive element 023 and the image side 0212 of the prism 021, the closer the diaphragm 024 is to the image side 0212, the more the required height of the prism 021 can be reduced.

Therefore, by configuring the first distance T1 between the diaphragm 024 and the first lens, it can reduce the required height of the prism 021 to adapt to the miniaturization trend of portable terminal.

In some examples, the value range of the first distance T1 may be (0,1 mm].

Figure 3:
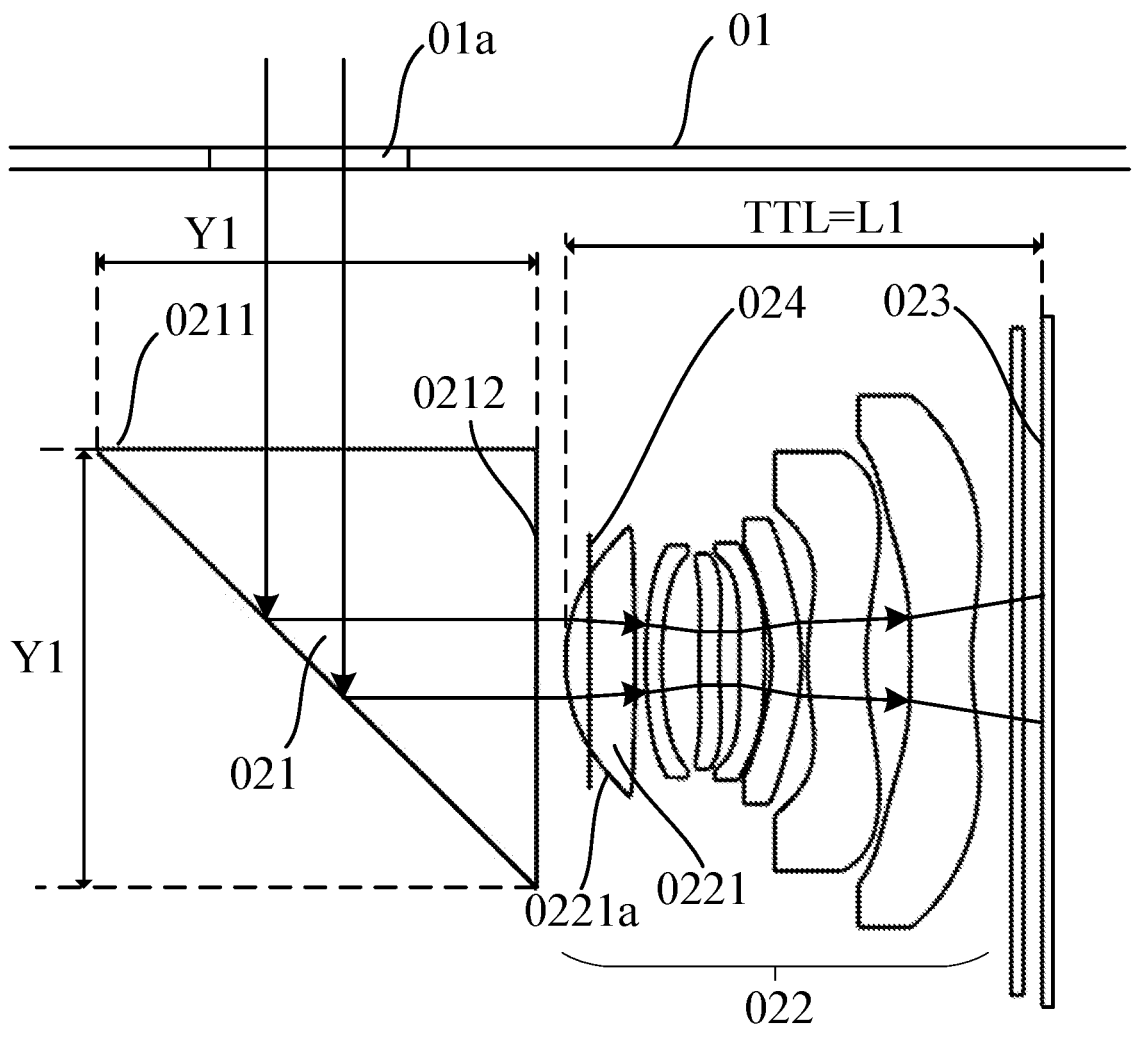
FIG. 3 is a schematic structural diagram of a terminal device illustrated in an embodiment of the present disclosure.

In one example, as shown in FIG. 3, the lens group 022 includes a first lens 0221, the first lens 0221 is a lens close to the image side 0212 in the lens group 022, and the first lens 0221 has an object side 0221a protruded toward the image side 0212. The diaphragm 024 is sleeved at an outer ring of the object side 0221a.

In some examples, the value range of the distance between the diaphragm 024 and the object side 0221a may be [−1 mm, 0].

In this way, the size of the camera in the width or length direction of the terminal (that is, the total size between the left and right ends of the camera in FIG. 3) can be reduced.

Nowadays, with the technological development in the field of terminal device, the competition in the terminal device market is becoming more and more intense. This competitive phenomenon is particularly evident in the smartphone market. Nowadays, smartphones are gradually becoming smaller. At the same time, for smart phones, improving the photographing performance of mobile phones has become one of the important means for various brand manufacturers to enhance their competitiveness.

In related technologies, usually multiple cameras are disposed on one type of mobile phone. Different cameras are suitable for different usage scenarios. In this way, when users are in different usage scenarios, different cameras can perform the photographing function, so that the user's photographing experience in different usage scenarios can be improved to enhance the competitiveness of the brand. Among the multiple cameras, the main camera is used to perform photographing functions in the most usage scenarios. The main camera usually includes a lens group. To ensure the image quality, the number of lenses in the main camera is relatively large, which leads to a relatively large size of the main camera, and hinders the miniaturization design of mobile phones.

In this regard, an embodiment of the present disclosure provides a terminal device. The terminal device includes multiple cameras, and the multiple cameras include a first camera 02. The first camera 02 is the main cameras among multiple cameras in the terminal device.

In some examples, the terminal device may include a telephoto camera, a wide-angle camera, and an ultra-wide-angle camera, and the main camera in the terminal device may be the wide-angle camera.

As shown in FIG. 1, the terminal device includes a first board 01 and a first camera 02.

The prism 021 has an object side 0211 and an image side 0212. The light transmitted through the light-transmitting region Ola sequentially passes through the object side 0211 of the prism 021, the image side 0212 of the prism 021, and the lens group 022 and irradiates onto the photosensitive element 023. The field of view of the light that can be received by the photosensitive element 023 is within a preset value range, and the preset value range is greater than or equal to 55°. That is, the view field angle of the first camera 02 is greater than or equal to 55°. According to FIG. 1, it is easy to see that the light received by the photosensitive element 023 is sequentially transmitted through the light-transmitting area 01a, the object side 0211 of the prism 021, the image side 0212 of the prism 021 and the lens group 022.

In some examples, the first board 01 has a light-transmitting area 01a. The first camera 02 includes a prism 021, a lens group 022 and a photosensitive element 023. The prism 021 has an object side 0211 and an image side 0212. The object side 0211 of the prism 021 is located at a light exiting direction of the light-transmitting area 01. The lens group 022 and the photosensitive element 023 are arranged sequentially in the light emitting direction of the image side 0212 of the prism 021, and the optical axis 022a of the lens group 022 is not parallel to the vertical line 011a of the light-transmitting area 01a.

For the specific structure of the first camera 02 in the terminal device, reference may be made to the above, and repeated descriptions will not be repeated here.

In the terminal device, for the first camera 02, the ratio of the first length L1 of the first camera 02 to the combined focal length f of the lens group 022 may satisfy (L1/f)≥1.05.

In the embodiment, the first length L1 of the first camera 02 is the distance from the diaphragm 024 to the photosensitive element 023.

According to the experimental data results, when the ratio of the first length Ll of the camera to the focal length f of the lens group 022 satisfies (L1/f)≥1.05, the imaging quality of the camera meets the requirements, and at the same time it can greatly reduce the size in the direction of the length or width of the terminal, to adapt to the miniaturization trend of portable terminal.

In one example, as shown in FIG. 2, the diaphragm 024 is located between the image side 0212 and the lens group 022. At this time, the first length L1 of the camera (hereinafter also referred to as TTL length) is the distance from the diaphragm 024 to the photosensitive element 023.

In another example, as shown in FIG. 3, when the diaphragm 024 is sleeved at the outer circle of the object side 0221a of the first lens 0221, the first length L1 of the camera (hereinafter may also be referred to as the TTL length) is the distance from the object side 0221a to the photosensitive element 023.

In the embodiment, the distance from the object side 0221a of the first lens 0221 to the photosensitive element 023 is the distance from the tangential plane parallel to the photosensitive element 023 on the object side 0221a of the first lens 0221 to the photosensitive element 023.

Alternatively, in this example, the value range of the distance from the object side 0221a to the image side 0212 may be within the interval [0.02 mm, 1 mm].

According to the experimental data results, when the range of the distance from the object side 0221a to the image side 0212 can be within the interval [0.02 mm, 1 mm], the imaging quality of the camera meets the requirements, and at the same time, the size of the camera at the length or width direction of the terminal can be greatly reduced, so as to adapt to the miniaturization trend of portable terminals.

In some examples, the ratio of the first length L1 of the camera to the focal length f of the lens group 022 may be 1.4.

In the terminal device, for the first camera 02, the refractive index n1 of the prism 021 satisfies n1≥1.7.

The refractive index n1 of the prism 021 is negatively correlated with the size of the prism 021 in the thickness direction of the terminal. When the refractive index n1 of the prism 021 is larger, the refractive ability of the prism 021 is stronger, and the requirements of light refraction can be satisfied with a smaller height of the prism 021 in the camera. While when the refractive index n1 of prism 021 is smaller, the refractive ability of prism 021 is weaker, and a larger height of prism 021 in the camera is required to meet the requirements of light refraction.

In the terminal device, the refractive index n1 of the prism 021 of the first camera 02 satisfies n1≥1.7.

The refractive index n1 of the prism 021 is negatively correlated with the size of the prism 021 in the thickness direction of the terminal. When the refractive index n1 of the prism 021 is larger, the refractive ability of the prism 021 is stronger, and the requirements of light refraction can be satisfied with a smaller height of the prism 021 in the camera. While when the refractive index n1 of prism 021 is smaller, the refractive ability of prism 021 is weaker, and a larger height of prism 021 in the camera is required to meet the requirements of light refraction.

Alternatively, the prism 021 may be formed of various materials.

In some examples, the prism 021 may include a body and a refraction-increasing sheet, the material of the body may be a material with a relatively small refractive index, and the material of the refraction-increasing sheet may be a material with a relatively high refraction index.

In some alternative implementations, the refraction-increasing sheet is attached to the side wall of the body, and the connection method between the refraction-increasing sheet and the side wall of the body may be bonding.

The material constituting the prism 021 can be optical glass or quartz glass. Alternatively, the material of the prism 021 may also be made of resin, alkali metal halide, etc. The embodiment of the present disclosure does not limit the material of the prism 021.

In the terminal device, the first equivalent side length and the second equivalent side length of the prism 021 of the first camera 02 are equal, which are both Y1, and Y1 can satisfy 0.74Y≤Y1≤0.88Y.

When the prism 021 is a triangular prism whose top surface is an isosceles right triangle, and the object side 0211 of the prism 021 is parallel to the optical axis of the lens group 022, the first equivalent side length and the second equivalent side length of the prism 021 are equal, and both are the lengths of the right-angled sides of the top surface of the triangular prism.

When the object side 0211 and the image side 0212 of the prism 021 can be both curved surfaces, the first equivalent side length is the projection length of the object side 0211 of the prism 021 on the straight line where the optical axis 022a of the lens group 022 is located, and the second equivalent side length is the projection length of the image side 0212 of the prism 021 on the optical axis of the object side 0211 of the prism 021.

In the embodiment, $$Y = \left(\frac{Q \cdot H}{2F} + \frac{T}{2Q}\right) \cdot \frac{1}{1 - \frac{2X}{\sqrt{1 - X^2}}};$$

wherein $$X = \frac{1}{n1} \cdot \frac{1}{\sqrt{1 + 4Q^2}}.$$

In practice, take the example in which the prism 021 is a triangular prism whose top surface is an isosceles right triangle (hereinafter, it always take the example in which the prism 021 is a triangular prism whose top surface is an isosceles right triangle), the length Y1 of the right-angled side of the top surface of prism 021 is related to the optical factor Q of the camera, the refractive index n1 of the prism 021, the distance T between the object side 0221a in the lens group 022 and the image side 0212, the body diagonal H of the photosensitive element 023 and the aperture coefficient of the camera F, and the preset value Y of the length of the right-angled side of the top surface of the prism 021 can be determined by the above formula.

According to the experimental data results, when the length of the right-angle side Y1 of the top surface of the prism 021 and the preset value Y satisfy the relationship 0.74Y≤Y1≤0.88Y, the imaging quality of the camera meets the requirements, and size of the camera in the height direction of the terminal can be greatly reduced to accommodate the miniaturization trend of portable terminals.

Alternatively, the refractive index of the first lens 0221 can be n2, and the refractive index n1 of the prism 021 and the refractive index n2 of the first lens 0221 satisfy 0.83<(n1/n2)<1.7.

In this way, the height of the prism 021 and the thickness of the first lens 0221 can be reduced, thereby reducing the size of the prism 021.

In the terminal device, the ratio of the total length TT of the first camera 02 to the combined focal length f of the lens group 022 satisfies 1.6<(TT/f)<2.4.

Figure 11:
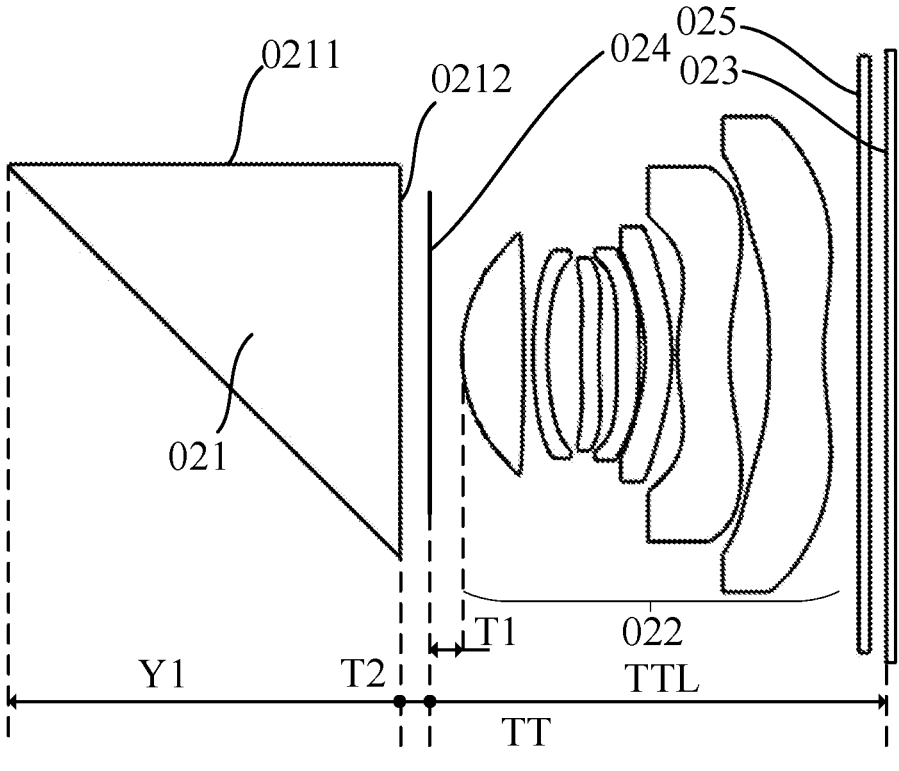
FIG. 11 is a schematic structural diagram of a camera illustrated in an embodiment of the present disclosure.

As shown in FIG. 11, the total camera length TT is the sum of the length Y1 of the right-angled side of the prism 021, the distance T2 from the image side 0212 to the diaphragm 024, and the length TTL from the photosensitive element 023 to the diaphragm 024.

According to the experimental data results, the ratio of the total length TT of the camera to the combined focal length f of the lens group 022 is limited to the interval (1.6,2.4), which can effectively reduce the size of the camera in the length direction or width direction of the terminal while meeting the imaging requirements of the camera.

In the terminal device, the ratio of the body diagonal H of the photosensitive element 023 to the total length TT of the first camera 02 satisfies 0.6<(H/TT)<0.9.

As shown in FIG. 11, the total camera length TT is the sum of the length Y1 of the right-angled side of the prism 021, the distance T2 from the image side 0212 to the diaphragm 024, and the length TTL from the photosensitive element 023 to the diaphragm 024.

According to the experimental data results, the ratio of the body diagonal H of the photosensitive element 023 to the total length TT is limited to the interval (0.6, 0.9), which can make the overall size distribution of the camera more compact while meeting the imaging requirements of the camera, so as to adapt to the miniaturization trend of portable terminal device.

In the terminal device, the aperture factor F of the first camera 02, the second equivalent side length Y1 of the prism 021, and the body diagonal length H of the photosensitive element 023 satisfy the relationship 0.1<Y1/(H·F)<0.6.

According to the experimental data results, the ratio of the right-angled side length Y1 of the prism 021 to the product of the aperture factor F of the camera and the body diagonal length H of the photosensitive element 023 is limited in the interval (0.1, 0.6), which can make the overall size distribution of the camera more compact while meeting the imaging requirements of the camera, so as to adapt to the miniaturization trend of portable terminal device.

The technical solutions provided by the embodiments of the present disclosure at least include the following beneficial effects:

An embodiment of the present disclosure provides a terminal device, and the terminal device includes a first board 01 and a first camera 02. The first board 01 has a light-transmitting area 01a. In the first camera 02, the light transmitted through the light-transmitting area 01a passes through the object side 0211 of the prism 021, the image side 0212 of the prism 021, and the lens group 022 in sequence, and illuminates the photosensitive element 023. The optical axis 022a of the lens group 022 is not parallel to the vertical line 011a of the light-transmitting area 01a. In this way, in the terminal device, the lens group 022 can be arranged in a direction that is not parallel to the vertical line 011a of the light-transmitting area 01a, so that the size of the terminal device in direction of the vertical line 011a of the light-transmitting area 01a can be reduced, that is, the thickness size of the terminal device can be reduced.

An embodiment of the present disclosure provides a camera 02. As shown in FIG. 1, the camera 02 includes a prism 021, a lens group 022, and a photosensitive element 023. By using the camera 02 provided by the embodiment of the present disclosure, the size of the camera in the thickness direction of the terminal can be reduced.

FIG. 1 is a schematic structural diagram of a camera provided by an embodiment of the present disclosure. As shown in FIG. 1, the camera includes a prism 021, a lens group 022 and a photosensitive element 023.

As shown in FIG. 1, the light transmitted through the prism 021 sequentially passes through the object side 0211 of the prism 021, the image side 0212 of the prism 021, and the lens group 022 to irradiate onto the photosensitive element 023. The optical axis of the lens group 022 is not parallel to the vertical line Ola of the light-transmitting area. For the photosensitive unit 023, the field of view range of the light that the photosensitive element 023 can receive is within a preset value range, and the preset value range is greater than or equal to 55°. That is, the angle of view thereof is greater than or equal to 55°. It is not difficult to see from FIG. 2 that the light received by the photosensitive element 023 is the light transmitted through the object side 0211 of the prism 021, the image side 0212 of the prism 021 and the lens group 022 in sequence.

In some examples, the prism 021 has an object side 0211, an image side 0212 and a reflecting side 0213. The lens group 022 and the photosensitive element 023 are located in the light exiting direction of the image side 0212, and the optical axis 022a of the lens group 022 is not parallel to the optical axis of the object side 0211 of the prism 021.

Hereinafter, each part of the camera is introduced separately:

1. Prism 021

The prism 021 is a component used to refract light in the camera.

As shown in FIG. 1 (FIG. 1 is a front view of the prism 021), the prism 021 has a triangular prism structure.

In the embodiment, the top surface (refer to FIG. 1) and the bottom surface of the prism 021 are two identical isosceles right triangles, and the side edges of the triangular prism structure are all perpendicular to the top surface of the prism 021.

As shown in FIG. 1, with the top surface of the prism 021 as a reference, the top surface has two right-angled sides and a hypotenuse. The sides where the two right-angled sides are located are respectively the object side 0211 and the image side 0212 of the prism 021, and side where the hypotenuse is located is the reflecting side 0213 of the prism 021.

In some alternative implementations, the lengths of the two right-angled sides of the top surface are equal, and correspondingly, the included angles between the object side 0211 and the image side 0212 of the prism 021 and the reflecting side 0213 are all 45°.

In this way, as shown in FIG. 1, when light vertically enters the prism 021, after passing through the reflecting side 0213, the prism 021 can emit the light horizontally from the image side 0212.

Alternatively, both the object side 0211 and the image side 0212 of the prism 021 may be non-planar.

In an example, the object side 0211 and the image side 0212 of the prism 021 may both be curved surfaces, and both protrude toward the outer normal direction of the prism 021.

In this way, the processing difficulty of the prism 021 can be reduced.

2. Lens Group 022

The lens group 022 is a component for diverging or converging light in the camera.

As shown in FIG. 1, the lens groups 022 are arranged sequentially in the light emitting direction of the image side 0212 of the prism 021.

In some alternative implementations, the light enters the prism from the outside through the object side 0211, is reflected to the image side 0212 through the reflecting side 0213, and then exits the prism 021 through the image side 0212, and by disposing the lens group 022 in the light exiting direction of the image side 0212, the light exit from the prism 021 can be directly incident on the lens group 022.

The combined focal length of the lens group 022 is f.

3. Photosensitive Element 023

The photosensitive element 023 is a component in the camera that converts light into an image.

As shown in FIG. 1, the photosensitive element 023 is located in the light exiting direction of the prism 021, and is located on the side of the lens group 022 away from the image side 0212. That is, the photosensitive element 023 is located in the light exiting direction of a lens farthest from the image side 0212 of the prism 021 in the lens group 022.

In some alternative implementations, the light passes through the reflecting side of the prism 021, the direction of propagation changes, and then radiates from the image side 0212 of the prism 021 to the lens group 022, and the photosensitive element 023 is arranged in the light-exiting direction of the lens group 022, which can make the structure of the camera more compact.

The photosensitive element 023 has a rectangular plate-like structure, and the length of the body diagonal of the rectangular plate-like structure is H.

For the camera including the prism 021, the lens group 022 and the photosensitive element 023, the optical factor Q of the camera satisfies $0.5 \le Q \le 0.9$.

In the embodiment, the optical factor Q is the ratio of the focal length f of the lens group 022 to the body diagonal length H of the photosensitive element 023.

For the photosensitive unit 023, the range of the field of view that it can receive the light from passing through the light-transmitting area 01a, the object side 0211 of the prism 021, the image side 0212 of the prism 021, and the lens group 022 can be represented by the size of the photosensitive element 023 and the combined focal length f of the lens group 022.

Figure 12:
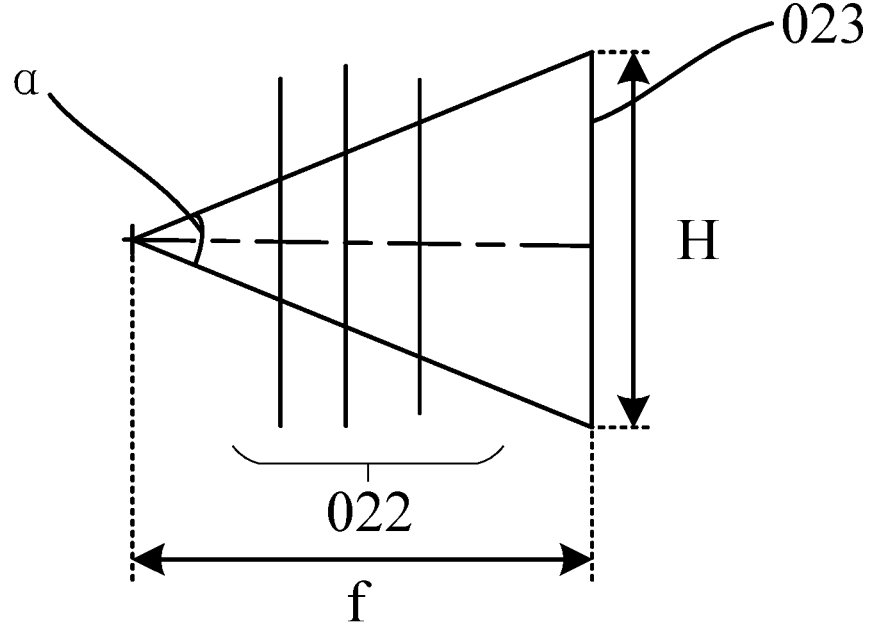
FIG. 12 is a schematic structural diagram of a camera illustrated in an embodiment of the present disclosure.

As shown in FIG. 12, the combined focal length of the lens group 022 is f, and the body diagonal of the photosensitive element 023 is H. According to the trigonometric function relationship, if the field angle is $\alpha$, then $0.5 \ H/f = \tan (\alpha/2)$, and according to the arc tangent formula, $\alpha = 2 \arctan (1/(2Q))$.

In practice, the optical factor Q can characterize the camera's field of view. When the camera's optical factor Q satisfies $0.5 \le Q \le 0.9$, the camera's field of view ranges from about 58° to 90°. Compared with the usual wide-angle camera whose field of view ranges from about 70° to 90°, this camera 02 has a larger field of view range, and users can use camera 02 for photographing in different usage scenarios.

In some possible examples, technicians can adjust the optical factor Q of the camera according to product requirements, and the field of view of the camera will change accordingly. After adjustment, the field of view of the camera can be greater than or equal to 55°.

Hereinafter, some alternative structural features of camera 02 are introduced respectively:

Structural Features 1. The Camera May Also Include a Diaphragm 024

The diaphragm 024 has a ring structure, and the clear aperture of the diaphragm 024 is D, and the value of D can be configured according to actual needs.

In the camera, the aperture factor F of the camera satisfies $1.0 < F < 1.95$.

In the embodiment, the aperture factor F is the ratio of the combined focal length f of the lens group 022 to the clear aperture D of the diaphragm 024.

In practice, when the relative positions of the lens group 022 and the diaphragm 024 remain unchanged, the larger the clear aperture D of the diaphragm 024 is, the larger the size of the corresponding prism 021 in the thickness direction of the terminal device is, the greater the amount of light entering the photosensitive element 023 passing through the diaphragm 024 is, and the better the imaging quality is. Correspondingly, when the relative position of the lens group 022 and the diaphragm 024 remains unchanged, the smaller the clear aperture D of the diaphragm 024 is, the smaller the size of the corresponding prism 021 in the terminal thickness direction is, the smaller the amount of light entering the photosensitive element 023 passing through the diaphragm 024 is, and the poorer the imaging quality is. Accordingly, technicians can configure the aperture coefficient of the camera according to actual needs, so as to balance the imaging quality of the camera and the size of the camera in the thickness direction of the terminal.

According to the experimental data results, it can be seen that when the aperture factor F of the camera satisfies $1.0 < F < 1.95$, the imaging quality of the camera meets the requirements, and at the same time, the size of the camera in the thickness direction of the terminal can be greatly reduced, to adapt to the miniaturization trend of the portable terminal.

In some examples, the actual value of the aperture factor F of the camera may be 1.61.

In an example, the diaphragm 024 is located between the image side 0212 and the lens group 022, and there is a first distance T1 between the diaphragm 024 and the first lens 0221 of the lens group 022.

As shown in FIG. 2, the diaphragm 024 is located on the side of the first lens 0221 close to the image side 0212 of the prism 021, the diaphragm 024 and the first lens 0221 have a first distance T1, and T1>0.

Referring to FIG. 10A and FIG. 10B, when the distance from the photosensitive element 023 to the prism 021 and the clear aperture D of the diaphragm 024 are equal, compared with the structure in which the diaphragm 024 is disposed on the side of the lens group 022 away from the object side 0211 of the prism 021, in the structure in which the diaphragm 024 is disposed on the side of the lens group 022 close to the image side 0212 of the prism 021, the required height of the prism 021 (i.e., the size of the prism 021 in the thickness direction of the terminal) can be effectively reduced. It is not difficult to see that in the case where the clear aperture D of the diaphragm 024 does not change, and the diaphragm 024 is between the photosensitive element 023 and the image side 0212 of the prism 021, the closer the diaphragm 024 is to the image side 0212, the more the required height of the prism 021 can be reduced.

Therefore, by configuring the first distance T1 between the diaphragm 024 and the first lens, it can reduce the required height of the prism 021 to adapt to the miniaturization trend of portable terminal.

In some examples, the value range of the first distance T1 may be (0,1 mm].

In one example, as shown in FIG. 3, the lens group 022 includes a first lens 0221, the first lens 0221 is a lens close to the image side 0212 in the lens group 022, and the first lens 0221 has an object side 0221a protruded toward the image side 0212. The diaphragm 024 is sleeved at an outer ring of the object side 0221a.

In some examples, the value range of the distance between the diaphragm 024 and the object side 0221a of the first lens 0221 may be [−1 mm, 0].

In this way, the size of the camera in the width or length direction of the terminal (that is, the total size between the left and right ends of the camera in FIG. 3) can be reduced.

Structural Feature 2. The Ratio of the First Length L1 of the Camera to the Combined Focal Length f of the Lens Group 022 Satisfies $(L1/f) \geq 1.05$ According to the experimental data results, when the ratio of the first length L1 of the camera to the combined focal length f of the lens group 022 satisfies $(L1/f) \geq 1.05$, the imaging quality of the camera meets the requirements, and at the same time it can greatly reduce the size in the direction of the length or width of the terminal, to adapt to the miniaturization trend of portable terminal.

In one example, as shown in FIG. 2, the diaphragm 024 is located at a side of the first lens 0221 close to the image side 0212 of the prism 021, and there is a first distance T1 between the first lens 0221 and the diaphragm 024, wherein T1>0. At this time, the first length L1 of the camera (hereinafter also referred to as TTL length) is the distance from the diaphragm 024 to the photosensitive element 023.

In another example, as shown in FIG. 3, when the diaphragm 024 is sleeved at the outer circle of the object side 0221a of the first lens 0221, the first length LI of the camera (hereinafter may also be referred to as the TTL length) is the distance from the object side 0221a of the first lens 0221 to the photosensitive element 023.

In the embodiment, the distance from the object side 0221a of the first lens 0221 to the photosensitive element 023 is the distance from the tangential plane parallel to the photosensitive element 023 on the object side 0221a of the first lens 0221 to the photosensitive element 023.

Alternatively, in this example, the value range of the distance from the object side 0221a of the first lens 0221 to the image side 0212 may be within the interval [0.02 mm, 1 mm].

According to the experimental data results, when the range of the distance from the object side 0221a of the first lens 0221 to the image side 0212 can be within the interval [0.02 mm, 1 mm], the imaging quality of the camera meets the requirements, and at the same time, the size of the camera at the length or width direction of the terminal can be greatly reduced, so as to adapt to the miniaturization trend of portable terminals.

In some examples, the ratio of the first length L1 of the camera to the combined focal length f of the lens group 022 may be 1.4.

Structural Feature 3. The Lens Group 022 Can All Be Aspherical

As shown in FIG. 1, the lens group 022 is arranged sequentially in the light exiting direction of the image side 0212 of the prism 021, and each lens in the lens group 022 can be a convex lens or a concave lens.

For each lens in the lens group 022, its surface close to the prism 021 is the object side of the lens, and its surface away from the prism 021 is the image side of the lens. For any lens, the object side and the image side of the lens can all be aspheric surface, the surface type of aspheric surface can be defined by formula (1):

$$z(r) = \frac{c_{bfs} \cdot r^2}{1 + \sqrt{1 - c_{bfs}^2(k+1)r^2}} + \frac{u^2 \cdot (1 - u^2)\sqrt{1 - c_{bfs}^2 kr^2}}{\sqrt{1 - c_{bfs}^2(k+1)r^2}} \sum_{m=0}^{13} a_m Q_m(u^2) \quad (1)$$

In the embodiment, z represents the depth of the aspheric surface, r represents the distance between a specific point on the aspheric surface and the optical axis of the prism, k represents the conic coefficient, $u=r/r_n$, $r_n$ is the normalized curvature, $a_m$ represents the m-th order aspheric coefficient, and $Q_m$ represents the m-th order polynomial.

In this way, the use of polynomials to represent the aspheric surface shape can make the object-side surface and image-side surface of the lens more stable, less prone to abrupt changes, and less prone to abnormal refraction or reflection when light is projected through the lens.

Figure 4:
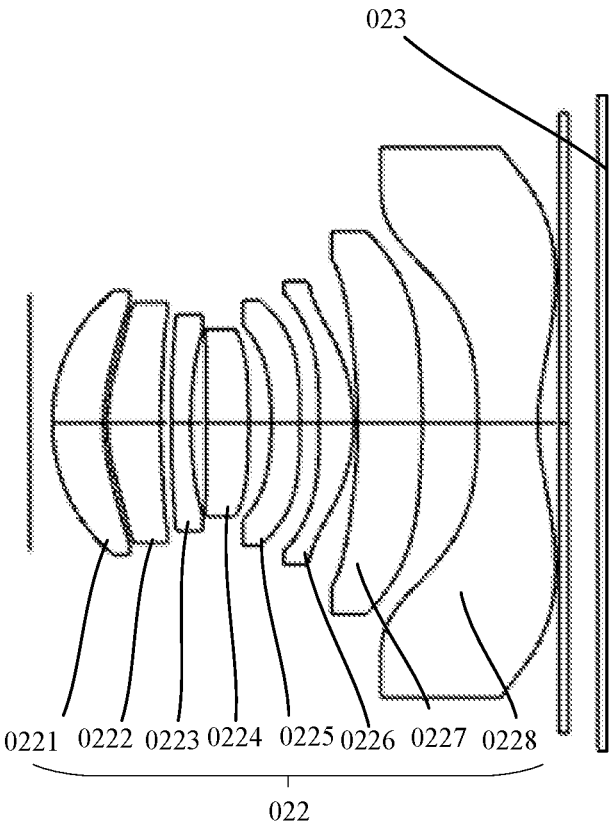
FIG. 4 is a schematic structural diagram of a camera illustrated in an embodiment of the present disclosure.

In one example, referring to FIG. 4 (FIG. 4 is a configuration diagram of a first example of a camera), the lens group 022 includes a first lens 0221, a second lens 0222, a third lens 0223, a fourth lens 0224, a fifth lens 0225, a sixth lens 0226, a seventh lens 0227 and an eighth lens 0228. A prism 021 may be provided in the light incident direction of the first lens 0221, and a photosensitive element 023 may be provided in the light exit direction of the eighth lens 0228.

In this example, the half-diagonal size of the photosensitive element 023 is 8.166 mm, the EFL (Effective Focal Length) of the camera is 10.75 mm, and the FOV (Field of View) of the camera is 73°, the aperture factor of the camera is 1.69, the length of the right-angled side of the prism 021 is 12 mm, the first length L1 of the camera (also known as the TTL length, explained below) is 13.567 mm, the length of the camera's CRA (Confocal Laser Scanning Microscope) is 35, the distance between the diaphragm 024 and the first lens 0221 is −1.19525 mm (negative value indicates that the diaphragm 024 is located on the side of the first lens 0221 away from the image 0212).

The optical characteristics of each element of the camera are shown in Table 1 below, including radius of curvature, thickness of the element or distance to the next element, refractive index, Abbe number (coefficient of dispersion), and focal length.

TABLE 1

| Surface number | Element | Radius of curvature r | Thickness or distance d | Refractive index nd | Abbe number vd |
|---|---|---|---|---|---|
| S0 | Prism | Unlimited | 12 | 1.8 | 17 |
| S1 | | Unlimited | 0.5643847 | | |
| R1 | First | 4.534712 | 1.258253 | 1.5346 | 55.695 |
| R2 | Lens | 4.205893 | 0.106086 | | |
| R3 | Second | 3.843697 | 1.322533 | 1.5346 | 55.695 |
| R4 | Lens | 15.09756 | 0.2676047 | | |
| R5 | Third | 32.32809 | 0.487997 | 1.687 | 18.3 |
| R6 | Lens | 10.47083 | 0.367023 | | |
| R7 | Fourth | −26.81294 | 1.071614 | 1.5346 | 55.695 |
| R8 | Lens | −28.8094 | 0.562261 | | |
| R9 | Fifth | −9.37468 | 0.718521 | 1.687 | 18.3 |

TABLE 1-continued

| Surface number | Element | Radius of curvature r | Thickness or distance d | Refractive index nd | Abbe number vd |
|---|---|---|---|---|---|
| R10 | Lens | −25.893 | 0.465887 | | |
| R11 | Sixth | −31.0854 | 0.86487 | 1.5661 | 37.708 |
| R12 | Lens | −3.97342 | 0.106086 | | |
| R13 | Seventh | −9.26248 | 1.591294 | 1.5346 | 55.695 |
| R14 | Lens | −16.9812 | 1.379122 | | |
| R15 | Eighth | −21.065 | 1.506565 | 1.5346 | 55.695 |
| R16 | Lens | 4.9116 | 0.530432 | | |

Table 2 and Table 3 below show the aspherical surface coefficients of the 16 surfaces included in the first lens 0221 to the eighth lens 0228. The first lens 0221 to the eighth lens 0228 have a total of 8 lens object sides and 8 lens image sides, and these 8 lens object sides and 8 lens image sides are all aspherical surfaces.

TABLE 2

| Surface number | K | A3 | A4 | A5 | A6 |
|---|---|---|---|---|---|
| R1 | 0.757836 | −0.16406 | −0.03499 | 0.01401 | 0.005478 |
| R2 | −1.31671 | −0.41811 | 0.053991 | −0.00519 | 0.00081 |
| R3 | −12.2936 | 0.034124 | −0.02587 | 0.025126 | 0.0026 |
| R4 | 7.0596 | −0.10704 | 0.0153 | 0.003603 | 0.000746 |
| R5 | 69.51327 | −0.01814 | 0.002166 | −0.00333 | 0.000263 |
| R6 | 15.64218 | −0.0443 | −0.00531 | −0.00245 | 0.000394 |
| R7 | 99.99 | −0.17428 | −0.00756 | 0.001128 | 0.000782 |
| R8 | 92.48098 | −0.21105 | −0.01186 | 0.000495 | 7.11E−05 |
| R9 | 0.572853 | −0.38276 | 0.000587 | −0.00078 | 0.000123 |
| R10 | 67.12618 | −0.61797 | 0.018343 | −0.00345 | 0.002461 |
| R11 | −90.4059 | −0.75733 | 0.031745 | 0.00311 | −0.0048 |
| R12 | −11.5981 | −0.56225 | 0.235775 | −0.02969 | −0.01667 |
| R13 | 1.215885 | 0.535049 | −0.21554 | 0.029399 | −0.02078 |
| R14 | 9.86839 | −0.48565 | −0.01082 | 0.117025 | 0.012106 |
| R15 | 0 | −2.48262 | 1.069002 | −0.0968 | −0.05353 |
| R16 | −1 | −7.77967 | 1.225412 | −0.25663 | 0.160963 |

TABLE 3

| Surface number | A7 | A8 | A9 | A10 | A11 |
|---|---|---|---|---|---|
| R1 | −0.00244 | −0.00097 | −0.00039 | −0.00016 | −4.8E−05 |
| R2 | −0.00089 | 0.000561 | 2.45E−05 | 0.000185 | 1.416E−05 |
| R3 | 0.001876 | 0.000429 | 0.000387 | 0.000147 | 5.128E−05 |
| R4 | 0.000674 | 0.000348 | 0.000148 | 6.83E−05 | 5.104E−05 |
| R5 | 0.000147 | 0.000121 | 3.06E−05 | 2.74E−05 | −9.56E−07 |
| R6 | 2.6E−05 | 2.82E−05 | −7.5E−06 | 1.27E−05 | −3.53E−07 |
| R7 | 0.000177 | 3.74E−05 | 1.54E−05 | 6.02E−06 | 7.956E−06 |
| R8 | −4.1E−05 | −4.3E−05 | −4E−06 | −2.9E−06 | 9.236E−07 |
| R9 | 8.2E−06 | 6.43E−05 | 1.5E−05 | 1.69E−05 | 3.8E−06 |
| R10 | 0.001101 | 0.000493 | −4.6E−05 | 6.14E−05 | −1.14E−05 |
| R11 | −0.00268 | 0.00166 | −0.00136 | −5.6E−05 | 4.963E−06 |
| R12 | −0.00056 | 0.000935 | 0.000107 | 0.000366 | −7.42E−05 |
| R13 | 0.025394 | 0.002362 | 0.006738 | 0.000392 | 0.0011301 |
| R14 | 0.031778 | 0.015247 | 0.005208 | 0.000583 | −1.5E−05 |
| R15 | −0.01372 | 0.02122 | −0.00318 | −0.00142 | −0.000154 |
| R16 | −0.06373 | 0.020714 | −0.01229 | 0.005576 | −0.001519 |

Figure 5:
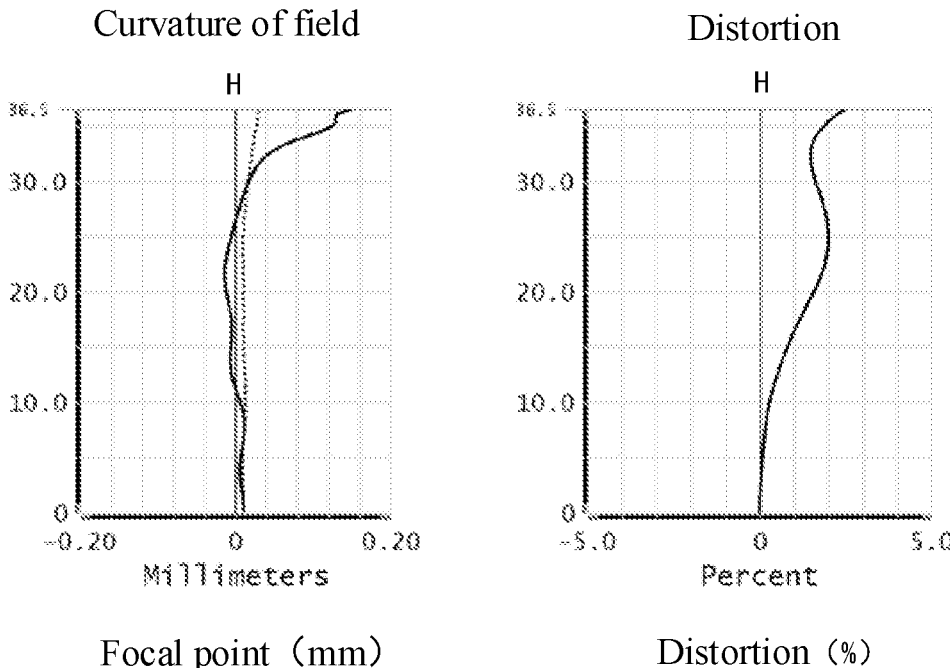
FIG. 5 is a graph showing an aberration characteristic of a camera illustrated in an embodiment of the present disclosure.

FIG. 5 is a graph showing the aberration characteristics of the camera shown in FIG. 4.

Alternatively, the first lens 0221 may be a convex lens, and the length Y1 of a right-angled side between the object side 0221a and the prism 021 satisfies 0<(R1/Y1)<12.

In this way, the height dimension of the camera can be reduced.

Figure 6:
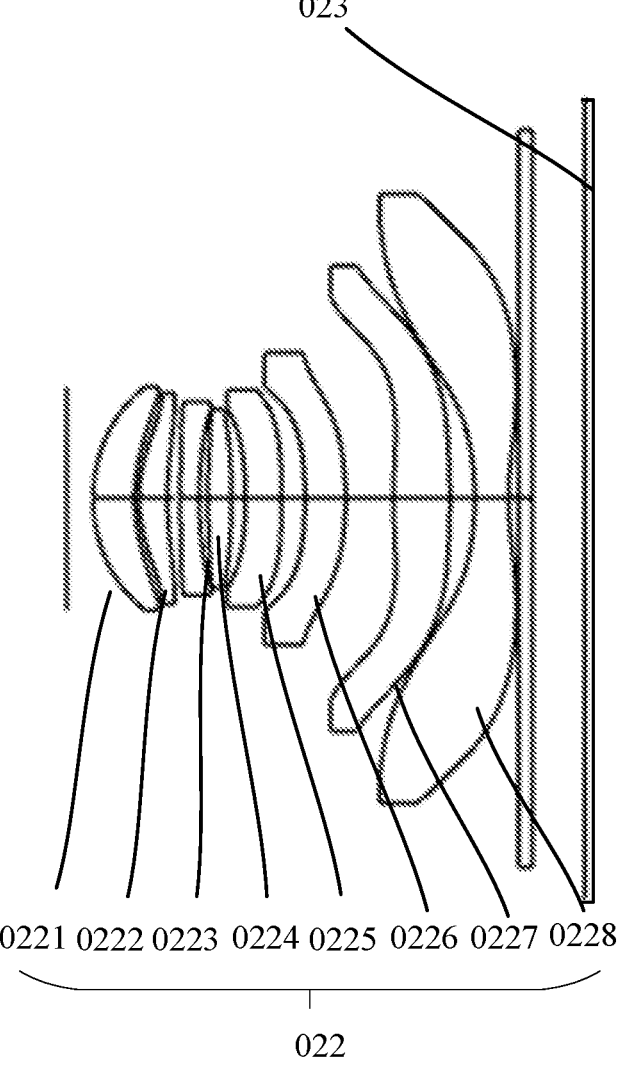
FIG. 6 is a schematic structural diagram of a camera illustrated in an embodiment of the present disclosure.

In one example, referring to FIG. 6 (FIG. 6 is a configuration diagram of a first example of a camera), the lens group 022 includes a first lens 0221, a second lens 0222, a third lens 0223, a fourth lens 0224, a fifth lens 0225, a sixth lens 0226, a seventh lens 0227 and an eighth lens 0228. A prism 021 and a photosensitive element 023 may be respectively arranged on the front side and the rear side of the lens group 022.

In this example, the half-diagonal size of the photosensitive element 023 is 8.166 mm, the EFL (Effective Focal Length) of the camera is 8.955 mm, and the FOV (Field of View) of the camera is 83°, the aperture factor of the camera is 1.92, the length of the right-angled side of the prism 021 is 12 mm, the first length L1 of the camera (also known as the TTL length, explained below) is 10.35 mm, and the CRA (Confocal Laser Scanning Microscope) is 37, the distance between the diaphragm 024 and the first lens 0221 is −1.0496 mm (a negative value indicates that the diaphragm 024 is located on the side of the first lens 0221 away from the image side 0212).

The optical characteristics of each element of the camera are shown in Table 4 below, including radius of curvature, thickness of the element or distance to the next element, refractive index, Abbe number (coefficient of dispersion), and focal length.

TABLE 4

| Surface number | Element | Radius of curvature r | Thickness or distance d | Refractive index nd | Abbe number vd |
|---|---|---|---|---|---|
| S0 | Prism | Unlimited | 12 | 1.8(N1) | 17 |
| S1 | | Unlimited | 0.5495675 | | |
| R1 | First | 3.161849 | 0.8674344 | 1.5346 | 55.695 |
| R2 | Lens | 3.458401 | 0.1 | | |
| R3 | Second | 2.963093 | 0.5932368 | 1.5346 | 55.695 |
| R4 | Lens | 6.859363 | 0.2717754 | | |
| R5 | Third | 20.00723 | 0.4 | 1.687 | 18.3 |
| R6 | Lens | 8.212778 | 0.1819681 | | |
| R7 | Fourth | 16.981 | 0.4926637 | 1.5346 | 55.695 |
| R8 | Lens | −15.39845 | 0.2956246 | | |
| R9 | Fifth | −8.470429 | 0.7607902 | 1.687 | 18.3 |
| R10 | Lens | −19.65932 | 0.4868207 | | |
| R11 | Sixth | −10.13718 | 0.8532974 | 1.67 | 19.392 |
| R12 | Lens | −7.53181 | 1.015815 | | |
| R13 | Seventh | 13.89698 | 1.182016 | 1.5346 | 55.695 |
| R14 | Lens | −12.35334 | 0.5243996 | | |
| R15 | Eighth | −6.258918 | 0.7095259 | 1.5346 | 55.695 |
| R16 | Lens | 5.773372 | 0.2153846 | | |

Table 5 and Table 6 below show the aspherical surface coefficients of the 16 surfaces included in the first lens 0221 to the eighth lens 0228. The first lens 0221 to the eighth lens 0228 have a total of 8 lens object sides and 8 lens image sides, and these 8 lens object sides and 8 lens image sides are all aspherical surfaces.

TABLE 5

| Surface number | K | A3 | A4 | A5 | A6 |
|---|---|---|---|---|---|
| R1 | −0.16161 | 0.069537 | 0.012707 | −0.00057 | −0.00197 |
| R2 | −7.7943 | 0.054147 | −0.02055 | −0.00418 | −0.00402 |
| R3 | −7.90166 | 0.037347 | −0.05823 | 0.006752 | 1.68E−05 |
| R4 | −23.5465 | −0.07343 | −0.0127 | 0.006118 | 0.000752 |
| R5 | 84.34346 | −0.10287 | 0.019563 | −0.0052 | −0.001 |
| R6 | 15.46519 | −0.06108 | 0.010132 | −0.00124 | 0.001349 |
| R7 | −0.71656 | −0.02863 | 0.006059 | 0.007177 | 0.0036 |
| R8 | −10.541 | −0.05083 | 0.003167 | 0.004504 | 0.001851 |
| R9 | 16.30582 | −0.08678 | 0.007963 | 0.001948 | 0.001057 |
| R10 | −96.0946 | −0.39994 | −0.01149 | 0.003101 | 0.005441 |
| R11 | −9.05065 | −0.6395 | −0.02348 | 0.012533 | 0.011585 |
| R12 | −48.8749 | −0.71856 | 0.164257 | −0.00257 | −0.00053 |
| R13 | 0 | −1.93656 | 0.121215 | 0.04609 | 0.0138 |

TABLE 5-continued

| Surface number | K | A3 | A4 | A5 | A6 |
|---|---|---|---|---|---|
| R14 | 0 | −0.77372 | −0.05619 | 0.080254 | −0.03268 |
| R15 | 0 | 1.662825 | 0.765982 | 0.22831 | 0.105534 |
| R16 | −1 | −5.69207 | 0.84746 | −0.27753 | 0.140645 |

TABLE 6

| Surface number | A7 | A8 | A9 | A10 | A11 |
|---|---|---|---|---|---|
| R1 | −0.00148 | −0.0008 | −0.00037 | −0.00014 | −3.42E−05 |
| R2 | −0.00084 | 0.000176 | 0.00024 | 8.31E−05 | 3.055E−05 |
| R3 | 0.000795 | 0.000348 | 0.000208 | 6.84E−06 | 3.113E−06 |
| R4 | −1.7E−05 | 9.35E−05 | 2.92E−05 | −3.6E−06 | 4.05E−06 |
| R5 | −0.00057 | −0.00015 | −3.5E−06 | 1.11E−05 | 8.113E−06 |
| R6 | 0.000477 | 6.95E−05 | −3.8E−07 | −1.1E−05 | −1.2E−06 |
| R7 | 0.001059 | 0.000196 | 4.91E−06 | −5E−06 | −6.32E−06 |
| R8 | 0.000442 | 8.12E−05 | 1.02E−05 | 9.49E−06 | 8.204E−06 |
| R9 | 0.000446 | 0.000182 | 8.61E−05 | 2.8E−05 | 1.403E−05 |
| R10 | 0.002961 | 0.001301 | 0.000484 | 0.000126 | 2.367E−05 |
| R11 | 0.005777 | 0.002269 | 0.00069 | 0.000142 | 4.732E−06 |
| R12 | −0.00321 | 0.000316 | 0.000159 | 0.000117 | −5.22E−05 |
| R13 | 0.004262 | −0.0058 | −0.00016 | 0.000557 | −7.91E−05 |
| R14 | 0.021735 | −0.00987 | 0.001 | 0.000831 | −0.000205 |
| R15 | 0.00332 | −0.00908 | 0.0152 | −0.00604 | 0.0029571 |
| R16 | −0.04067 | 0.017652 | −0.01094 | 3.69E−05 | 0.0005394 |

Figure 7:
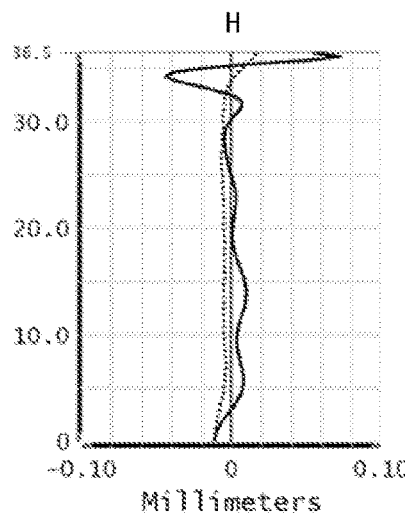
FIG. 7 is a graph showing an aberration characteristic of a camera illustrated in an embodiment of the present disclosure.
Figure 7:
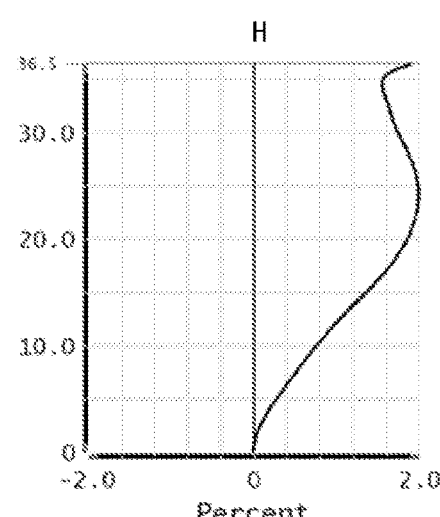

FIG. 7 is a graph showing the aberration characteristics of the camera shown in FIG. 6.

Alternatively, the first lens 0221 may be a convex lens, and the length Y1 of a right-angled side between the object side 0221a and the prism 021 satisfies 0<(R1/Y1)<12.

In this way, the height dimension of the camera can be reduced.

Figure 8:
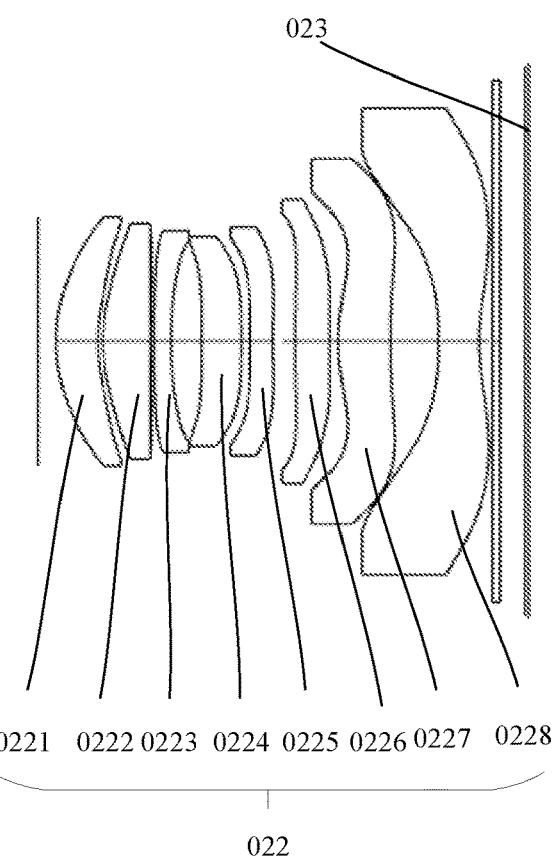
FIG. 8 is a schematic structural diagram of a camera illustrated in an embodiment of the present disclosure.

In one example, referring to FIG. 8 (FIG. 8 is a configuration diagram of a first example of a camera), the lens group 022 includes a first lens 0221, a second lens 0222, a third lens 0223, a fourth lens 0224, a fifth lens 0225, a sixth lens 0226, a seventh lens 0227 and an eighth lens 0228. A prism 021 and a photosensitive element 023 may be respectively arranged on the front side and the rear side of the lens group 022.

In this example, the semi-diagonal size of the photosensitive element 023 is 8.166 mm, the EFL (Effective Focal Length) of the camera is 10.805 mm, and the FOV (Field of View) of the camera is 73°, the aperture factor of the camera is 1.4, the length of the right-angled side of the prism 021 is 12 mm, the first length L1 of the camera (also known as the TTL length, explained below) is 14.262 mm, and the CRA (Confocal Laser Scanning Microscope) is 35, and the distance between the diaphragm 024 and the first lens 0221 is 0.53469 mm.

The optical characteristics of each element of the camera are shown in Table 7 below, including radius of curvature, thickness of the element or distance to the next element, refractive index, Abbe number (coefficient of dispersion), and focal length.

TABLE 7

| Surface number | Element | Radius of curvature r | Thickness or distance d | Refractive index nd | Abbe number vd |
|---|---|---|---|---|---|
| S0 | Prism | Unlimited | 12 | 1.8 | 17 |
| S1 | | Unlimited | 0.5369 | | |
| R1 | First | 5.208362 | 1.2 | 1.5346 | 55.695 |
| R2 | Lens | 5.391062 | 0.140444 | | |

TABLE 7-continued

| Surface number | Element | Radius of curvature r | Thickness or distance d | Refractive index nd | Abbe number vd |
|---|---|---|---|---|---|
| R3 | Second | 4.755838 | 1.4 | 1.5346 | 55.695 |
| R4 | Lens | 40.76421 | 0.084035 | | |
| R5 | Third | 34.72072 | 0.5 | 1.687 | 18.3 |
| R6 | Lens | 11.56838 | 0.902633 | | |
| R7 | Fourth | −109.575 | 1.144802 | 1.5346 | 55.695 |
| R8 | Lens | −26.6338 | 0.252725 | | |
| R9 | Fifth | 373.6373 | 0.660535 | 1.687 | 18.3 |
| R10 | Lens | 34.99423 | 0.65 | | |
| R11 | Sixth | 40.51407 | 1 | 1.5661 | 37.708 |
| R12 | Lens | 30.71562 | 0.250933 | | |
| R13 | Seventh | 5.780439 | 1.5 | 1.5346 | 55.695 |
| R14 | Lens | 43.95996 | 1.4 | | |
| R15 | Eighth | −15.3243 | 1.176272 | 1.5346 | 55.695 |
| R16 | Lens | 5.78945 | 0.4 | | |

Table 8 and Table 9 below show the aspherical surface coefficients of the 16 surfaces included in the first lens 0221 to the eighth lens 0228. The first lens 0221 to the eighth lens 0228 have a total of 8 lens object sides and 8 lens image sides, and these 8 lens object sides and 8 lens image sides are all aspherical surfaces.

TABLE 8

| Surface number | K | A3 | A4 | A5 | A6 |
|---|---|---|---|---|---|
| R1 | 0.700232 | −0.4075 | −0.07115 | 0.01845 | 0.00599 |
| R2 | −1.24346 | −0.54145 | 0.102912 | −0.01518 | −0.00738 |
| R3 | −10.0968 | 0.059485 | 0.003819 | −0.00135 | −0.014 |
| R4 | 16.1405 | −0.18314 | 0.015762 | −0.00511 | −0.00034 |
| R5 | 56.37651 | 0.034813 | 0.052746 | 0.004283 | 0.000801 |
| R6 | 12.8196 | −0.07895 | 0.015713 | 0.007263 | 0.000948 |
| R7 | 62.4881 | −0.33509 | −0.00291 | 0.009338 | 0.00052 |
| R8 | 65.29741 | −0.48478 | −0.00607 | 0.010849 | −0.00251 |
| R9 | −3.47983 | −0.59091 | −0.0001 | 0.009893 | 0.001216 |
| R10 | 91.32945 | −0.71177 | 0.000262 | 0.005695 | 0.003206 |
| R11 | 96.83952 | −0.52365 | −0.11164 | −0.01757 | 0.00257 |
| R12 | −13.1112 | −1.22897 | 0.156587 | −0.02477 | 0.016902 |
| R13 | −15.558 | −1.6504 | −0.09991 | 0.077933 | 0.008548 |
| R14 | 6.81123 | −1.35335 | 0.2999 | 0.121543 | 0.03308 |
| R15 | 5.290775 | −1.34225 | 0.761562 | −0.10962 | 0.046211 |
| R16 | −1.03821 | −6.07742 | 1.070251 | −0.26529 | 0.104402 |

TABLE 9

| Surface number | A7 | A8 | A9 | A10 | A11 |
|---|---|---|---|---|---|
| R1 | 0.00236 | −0.00066 | −7.6E−05 | 2.17E−05 | 1.074E−05 |
| R2 | −0.0014 | 0.000287 | 0.000281 | 0.000122 | 3.68E−05 |
| R3 | 0.00014 | 8.01E−05 | 0.000272 | 1.86E−05 | 3.326E−05 |
| R4 | 0.001446 | 0.000186 | 0.000242 | −4.9E−05 | 2.96E−05 |
| R5 | 0.00026 | 0.000139 | 0.000366 | 2.37E−05 | 3.989E−05 |
| R6 | −0.00074 | −0.00052 | −0.00017 | −8E−05 | −8.48E−06 |
| R7 | −0.00066 | −0.00028 | −4.6E−05 | −6.7E−06 | −5.95E−06 |
| R8 | −0.00036 | −9.8E−05 | 0.000162 | −2.7E−05 | 2.891E−06 |
| R9 | 0.001346 | 7.13E−05 | 0.000195 | −3.7E−05 | −3.07E−05 |
| R10 | 0.002489 | −0.00014 | 0.000213 | −2.2E−05 | −1.26E−05 |
| R11 | 0.003369 | −0.00162 | −0.00066 | −0.00037 | −8.7E−05 |
| R12 | 0.006484 | −0.00417 | −0.00185 | −0.00031 | 0.0001879 |
| R13 | 0.013795 | −0.00249 | −0.00182 | −0.00088 | 0.0003107 |
| R14 | 0.016604 | −0.00023 | 0.000493 | 0.001039 | −3.29E−05 |
| R15 | −0.00467 | 0.004574 | −0.00416 | 7.98E−06 | 0.000849 |
| R16 | −0.03181 | 0.021346 | −0.00604 | 0.002531 | −0.001329 |

Figure 9:
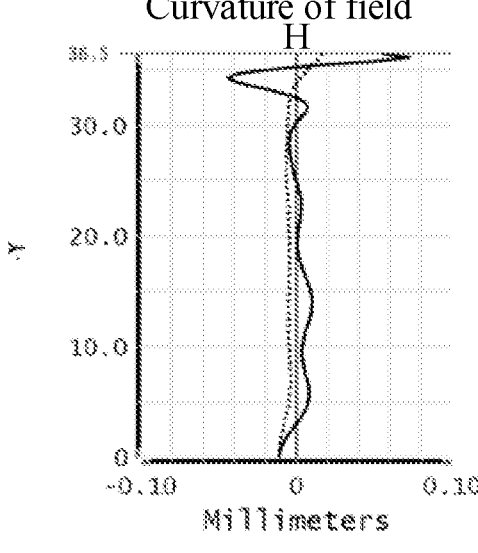
FIG. 9 is a graph showing an aberration characteristic of a camera illustrated in an embodiment of the present disclosure.
Figure 9:
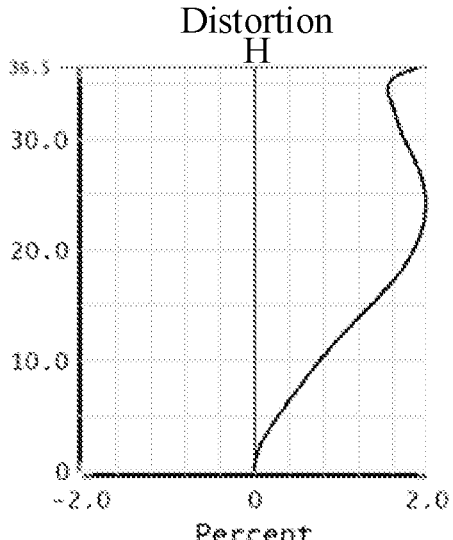

FIG. 9 is a graph showing the aberration characteristics of the camera shown in FIG. 8.

Alternatively, the first lens 0221 may be a convex lens, and the length Y1 of a right-angled side between the object side 0221a and the prism 021 satisfies 0<(R1/Y1)<12.

In this way, the height dimension of the camera can be reduced.

Structural Feature 4. The Refractive Index n1 of the Prism 021 Satisfies n1≥1.7

The refractive index n1 of the prism 021 is negatively correlated with the size of the prism 021 in the thickness direction of the terminal. When the refractive index n1 of the prism 021 is larger, the refractive ability of the prism 021 is stronger, and the requirements of light refraction can be satisfied with a smaller height of the prism 021 in the camera. While when the refractive index n1 of prism 021 is smaller, the refractive ability of prism 021 is weaker, and a larger height of prism 021 in the camera is required to meet the requirements of light refraction.

Alternatively, the prism 021 may be formed of various materials.

In some examples, the prism 021 may include a body and a refraction-increasing sheet, the material of the body may be a material with a relatively small refractive index, and the material of the refraction-increasing sheet may be a material with a relatively high refraction index.

In some alternative implementations, the refraction-increasing sheet is attached to the side wall of the body, and the connection method between the refraction-increasing sheet and the side wall of the body may be adhering.

The material constituting the prism 021 can be optical glass or quartz glass. Alternatively, the material of the prism 021 may also be made of resin, alkali metal halide, etc. The embodiment of the present disclosure does not limit the material of the prism 021.

Structural Feature 5. The First Equivalent Side Length and the Second Equivalent Side Length of the Prism 021 of the First Camera 02 are Equal, Which are Both Y1, and Y1 Can Satisfy 0.74Y≤Y1≤0.88Y When the prism 021 is a triangular prism whose top surface is an isosceles right triangle, and the object side 0211 of the prism 021 is parallel to the optical axis of the lens group 022, the first equivalent side length and the second equivalent side length of the prism 021 are equal, and both are the lengths of the right-angled sides of the top surface of the triangular prism.

When the object side 0211 and the image side 0212 of the prism 021 can be both curved surfaces, the first equivalent side length is the projection length of the object side 0211 of the prism 021 on the straight line where the optical axis 022a of the lens group 022 is located, and the second equivalent side length is the projection length of the image side 0212 of the prism 021 on the optical axis of the object side 0211 of the prism 021.

In the embodiment, $$Y = \left( \frac{Q \cdot H}{2F} + \frac{T}{2Q} \right) \cdot \frac{1}{1 - \frac{2X}{\sqrt{1 - X^2}}};$$

wherein $$X = \frac{1}{n1} \cdot \frac{1}{\sqrt{1 + 4Q^2}}.$$

In practice, take the example in which the prism 021 is a triangular prism whose top surface is an isosceles right triangle (hereinafter, it always take the example in which the prism 021 is a triangular prism whose top surface is an isosceles right triangle), the length Y1 of the right-angled side of the top surface of prism 021 is related to the optical factor Q of the camera, the refractive index n1 of the prism 021, the distance T between the object side 0221*a* in the lens group 022 and the image side 0212, the body diagonal H of the photosensitive element 023 and the aperture coefficient of the camera F, and the preset value Y of the length of the right-angled side of the top surface of the prism 021 can be determined by the above formula.

According to the experimental data results, when the length of the right-angle side Y1 of the top surface of the prism 021 and the preset value Y satisfy the relationship $0.74Y \leq Y1 \leq 0.88Y$, the imaging quality of the camera meets the requirements, and size of the camera in the height direction of the terminal can be greatly reduced to accommodate the miniaturization trend of portable terminals.

Alternatively, the refractive index of the first lens 0221 can be n2, and the refractive index n1 of the prism 021 and the refractive index n2 of the first lens 0221 satisfy $0.83 < (n1/n2) < 1.7$.

In this way, the height of the prism 021 and the thickness of the first lens 0221 can be reduced, thereby reducing the size of the prism 021.

Structural Feature 6. The Ratio of the Total Length TT of the First Camera 02 to the Combined Focal Length f of the Lens Group 022 Satisfies $1.6 < (TT/f) < 2.4$ As shown in FIG. 11, the total camera length TT is the sum of the length Y1 of the right-angled side of the prism 021, the distance T2 from the image side 0212 to the diaphragm 024, and the length TTL from the photosensitive element 023 to the diaphragm 024.

According to the experimental data results, the ratio of the total length TT of the camera to the combined focal length f of the lens group 022 is limited to the interval (1.6,2.4), which can effectively reduce the size of the camera in the length direction or width direction of the terminal while meeting the imaging requirements of the camera.

Structural Feature 7. The Ratio of the Body Diagonal H of the Photosensitive Element 023 to the Total Length TT of the First Camera 02 Satisfies $0.6 < (H/TT) < 0.9$ As shown in FIG. 11, the total camera length TT is the sum of the length Y1 of the right-angled side of the prism 021, the distance T2 from the image side 0212 to the diaphragm 024, and the length TTL from the photosensitive element 023 to the diaphragm 024.

According to the experimental data results, the ratio of the body diagonal H of the photosensitive element 023 to the total length TT is limited to the interval (0.6, 0.9), which can make the overall size distribution of the camera more compact while meeting the imaging requirements of the camera, so as to adapt to the miniaturization trend of portable terminal device.

Structural Feature 8. The Aperture Factor F of the First Camera 02, the Second Equivalent Side Length Y1 of the Prism 021, and the Body Diagonal Length H of the Photosensitive Element 023 Satisfy the Relationship $0.1 < Y1/(H \cdot F) < 0.6$ According to the experimental data results, the ratio of the right-angled side length Y1 of the prism 021 to the product of the aperture factor F of the camera and the body diagonal length H of the photosensitive element 023 is limited in the interval (0.1, 0.6), which can make the overall size distribution of the camera more compact while meeting the imaging requirements of the camera, so as to adapt to the miniaturization trend of portable terminal device.

Structural Features 9. The Camera Can Also Include Infrared Filter 025

As shown in FIG. 11, the infrared filter 025 is located on the side of the photosensitive element 023 close to the image side 0212, between the photosensitive element 023 and the lens group 022, and opposite to the image side 0212.

The infrared filter 025 has a thin plate-like structure. The infrared filter 025 is used to filter the infrared light in the light passing through the lens group 022, preventing the infrared light from entering the photosensitive element 023, so as to improve the imaging quality of the camera.

The material of the infrared filter 025 may be glass, such as colored glass, or plastic, and the embodiment of the present disclosure does not limit the material of the infrared filter 025.

Structural Features 10. The Camera is a Zoom Camera

Hereinafter, the feasible ways to zoom the camera are introduced one by one:

Mode One

The positions of the prism 021, the diaphragm 024 and the lens group 022 remain unchanged, and the photosensitive element 023 moves away from and close to the lens group 022.

In some alternative implementations, the prism 021, the aperture 024 and the lens group 022 are fixed in the photographing apparatus, the photosensitive element 023 is slidably connected to the photographing apparatus, and connected to a stepping motor, which is electrically connected to the terminal controller.

In some alternative implementations, the user can issue a zooming instruction on the terminal, and the controller controls the stepping motor to run after receiving the zooming instruction, so as to control the photosensitive element 023 to move in the direction of away from and close to the lens group 022, to achieve zooming.

In this way, zooming can be realized only by moving the photosensitive element 023, and the operation is relatively simple.

Mode Two

The positions of the prism 021 and the photosensitive element 023 remain unchanged, the relative positions of the diaphragm 024 and the lens group 022 remain unchanged, and the diaphragm 024 and the lens group 022 move between the prism 021 and the photosensitive element 023.

In some alternative implementations, the prism 021 and the photosensitive element 023 are fixed in the photographing apparatus, the diaphragm 024 and the lens group 022 are slidably connected to the photographing apparatus, and connected to a stepping motor, which is electrically connected to the terminal controller.

In some alternative implementations, the user can issue a zooming instruction on the terminal, and the controller controls the stepping motor to run after receiving the zooming instruction, to move the diaphragm 024 and the lens group 022 between the prism 021 and the photosensitive element 023, to achieve zooming.

In this way, there is no need to reserve the moving distance of the photosensitive element 023, and the size of the camera in terms of the length or width of the terminal can be reduced.

Mode Three

The positions of the prism 021, the diaphragm 024 and the photosensitive element 023 remain unchanged, the relative positions of the lens group 022 remain unchanged, and the lens group 022 moves between the diaphragm 024 and the photosensitive element 023.

In some alternative implementations, the prism 021, the diaphragm 024 and the photosensitive element 023 are fixed in the photographing apparatus, the lens group 022 is slidably connected to the photographing apparatus, and connected to a stepping motor, which is electrically connected to the terminal controller.

In some alternative implementations, the user can issue a zooming instruction on the terminal, and the controller controls the stepping motor to run after receiving the zooming instruction, so as to control the lens group 022 to move between the diaphragm 024 and the photosensitive element 023, to achieve zooming.

In this way, the diaphragm 024 does not need to move, and the imaging quality of the camera can be improved.

The above alternative structural features can be applied alone or in combination.

An embodiment of the present disclosure provides a photographing apparatus, where the photographing apparatus includes the above camera 02.

Embodiments of the present disclosure provide a terminal device, a camera, and a photographing apparatus, which can solve technical problems in related technologies. The technical solution is as follows:

In a first aspect, an embodiment of the present disclosure provides a terminal device, wherein the terminal device includes a first board and a first camera;

the first board includes a light-transmitting area;

the first camera includes a prism, a lens group, and a photosensitive element, the prism includes an object side and an image side, light transmitting through the light-transmitting area sequentially pass through the object side of the prism, the image side of the prism, and the lens group to irradiate onto the photosensitive element, a field of view of the light that the photosensitive element can receive is within a preset value range, and an optical axis of the lens group is not parallel to a vertical line of the light-transmitting area; and the preset value range is greater than or equal to 55°.

In a possible implementation, the vertical line of the light-transmitting area is perpendicular to the first board, and the optical axis of the lens group is perpendicular to the vertical line of the light-transmitting area.

In a possible implementation, an optical factor Q of the first camera satisfies 0.5≤Q≤0.9, wherein the optical factor Q is a ratio of a combined focal length f of the lens group to a body diagonal length H of the photosensitive element.

In a possible implementation, the first camera further includes a diaphragm, and an aperture factor F of the first camera satisfies 1.0<F<1.95, wherein the aperture factor F is a ratio of a combined focal length f of the lens group to a clear aperture D of the diaphragm.

In a possible implementation, the diaphragm is located in a light exit direction of the image side of the prism, and is located between the prism and a first lens, and the first lens is a lens closest to the prism in the lens group.

In a possible implementation, there is a first distance T1 between the diaphragm and the first lens, and T1>0.

In a possible implementation, a ratio of a first length L1 of the first camera to the combined focal length f of the lens group satisfies (L1/f)≥1.05, and wherein the first length L1 of the first camera is a distance from the diaphragm to the photosensitive element.

In a possible implementation, the first lens includes an object side protruded toward the image side of the prism; and the diaphragm is sleeved at an outer ring of the object side of the first lens.

In a possible implementation, the prism has a triangular prism structure, a ratio of a first length L of the first camera to the combined focal length f of the lens group satisfies (L/f)≥1.05, and wherein the first length L of the first camera is a distance from the object side of the first lens to the photosensitive element.

In a possible implementation, a distance T between the object side of the first lens and the image side of the prism satisfies 0.02 mm≤T≤1 mm.

In a possible implementation, a refractive index n1 of the prism satisfies n1≥1.7.

In a possible implementation, a first equivalent side length is equal to a second equivalent side length of the prism, which are both Y1, and the first equivalent side length Y1 satisfies 0.74Y≤Y1≤0.88Y; wherein:

the first equivalent side length is a length of a projection of the object side of the prism on a straight line where the optical axis of the lens group is located, and the second equivalent side length is a length of the projection of the image side of the prism on the vertical line of the light-transmitting area; and $$Y = \left(\frac{Q \cdot H}{2F} + \frac{T}{2Q}\right) \cdot \frac{1}{1 - \frac{2X}{\sqrt{1-X^2}}};$$

wherein $$X = \frac{1}{n1} \cdot \frac{1}{\sqrt{1+4Q^2}}.$$

In a second aspect, the embodiment of the present disclosure provides a camera, wherein the camera includes a prism, a lens group and a photosensitive element;

the prism includes an object side and an image side;

light transmitting through the prism sequentially pass through the object side of the prism, the image side of the prism, and the lens group to irradiate onto the photosensitive element, a field of view of the light that the photosensitive element can receive is within a preset value range, and an optical axis of the lens group is not parallel to an optical axis of the object side of the prism; and the preset value range is greater than or equal to 55°.

In a possible implementation, each optical axis of the lens group is perpendicular to the optical axis of the object side of the prism.

In a possible implementation, an optical factor Q of the camera satisfies $0.5 \leq Q \leq 0.9$, wherein the optical factor Q is a ratio of a combined focal length f of the lens group to a body diagonal length H of the photosensitive element.

In a possible implementation, the camera further includes a diaphragm, and an aperture factor F of the camera satisfies $1.0 < F < 1.95$, wherein the aperture factor F is a ratio of a combined focal length f of the lens group to a clear aperture D of the diaphragm.

In a possible implementation, the diaphragm is located in a light exit direction of the image side of the prism, and is located between the prism and a first lens, and the first lens is a lens closest to the prism in the lens group.

In a possible implementation, there is a first distance T1 between the diaphragm and the first lens, and T1>0.

In a possible implementation, a ratio of a first length L1 of the camera to the combined focal length f of the lens group satisfies L1/f>1.05, and wherein the first length L1 of the camera is a distance from the diaphragm to the photosensitive element.

In a possible implementation, the first lens includes an object side protruded toward the image side of the prism; and the diaphragm is sleeved at an outer ring of the object side of the first lens.

In a possible implementation, a ratio of a first length L1 of the camera to the combined focal length f of the lens group satisfies L1/f≥1.05, and wherein the first length L1 of the camera is a distance from the object side of the first lens to the photosensitive element.

In a possible implementation, a distance T between the object side of the first lens and the image side of the prism satisfies $0.02 \text{ mm} \leq T \leq 1 \text{ mm}$.

In a possible implementation, a refractive index n1 of the prism satisfies n1≥1.7.

In a possible implementation, a first equivalent side length is equal to a second equivalent side length of the prism, which are both Y1, and the first equivalent side length Y1 satisfies $0.74Y \leq Y1 \leq 0.88Y$; wherein:

the first equivalent side length is a length of a projection of the object side of the prism on a straight line where the optical axis of the lens group is located, and the second equivalent side length is a length of the projection of the image side of the prism on the optical axis of the object side of the prism is located; and $$Y = \left( \frac{Q \cdot H}{2F} + \frac{T}{2Q} \right) \cdot \frac{1}{1 - \frac{2X}{\sqrt{1 - X^2}}};$$

wherein $$X = \frac{1}{n1} \cdot \frac{1}{\sqrt{1 + 4Q^2}}.$$

In a third aspect, the embodiment of the present disclosure provides a photographing apparatus including the camera according to the second aspect and the implementations thereof.

The technical solutions provided by the embodiments of the present disclosure at least include the following beneficial effects:

An embodiment of the present disclosure provides a terminal device, wherein the terminal device includes a first board and a first camera. The first board has a light-transmitting area. In the first camera, the light transmitted through the light-transmitting area sequentially passes through the object side of the prism, the image side of the prism, and the lens group to irradiate the photosensitive element. The optical axis of the lens group is not parallel to the vertical line of the light-transmitting area. In this way, in the terminal device, the lens groups can be arranged in a direction not parallel to the vertical line of the light-transmitting area, so that the size of the terminal device in the direction of the vertical line of the light-transmitting area can be reduced, that is, the thickness dimension of the terminal device can be reduced.

It is to be understood that both the foregoing general description and the following detailed description are exemplary and explanatory only and are not restrictive of the disclosure.

The above descriptions are only alternative embodiments of the present disclosure, and are not intended to limit the present disclosure. Any modifications, equivalent replacements, improvements, etc. made within the spirit and principles of the present disclosure shall be included in the protection scope of the present disclosure.

What is claimed is:

1. A terminal device, comprising:

a first board and a first camera;

wherein the first board comprises a light-transmitting area;

wherein the first camera comprises a prism, a lens group, and a photosensitive sensor, the prism comprises an object side and an image side, light transmitting through the light-transmitting area sequentially pass through the object side of the prism, the image side of the prism, and the lens group to irradiate onto the photosensitive sensor, a field of view of the light that the photosensitive sensor receives is within a preset value range, and an optical axis of the lens group is not parallel to a vertical line of the light-transmitting area; and wherein the preset value range is greater than or equal to 55°, wherein a refractive index nl of the prism satisfies nl≥1.7, and wherein a first equivalent side length is equal to a second equivalent side length of the prism, which are both Y1, and the first equivalent side length Y1 satisfies $0.74Y \leq Y1 \leq 0.88Y$; wherein:

the first equivalent side length is a length of a projection of the object side of the prism on a straight line where the optical axis of the lens group is located, and the second equivalent side length is a length of the projection of the image side of the prism on the vertical line of the light-transmitting area; and $$Y = \left( \frac{Q \cdot H}{2F} + \frac{T}{2Q} \right) \cdot \frac{1}{1 - \frac{2X}{\sqrt{1 - X^2}}},$$

wherein, $$X = \frac{1}{n1} \cdot \frac{1}{\sqrt{1+4Q^2}},$$

Q indicates an optical factor of the first camera, F indicates an aperture factor of the first camera, H indicates a body diagonal length of the photosensitive sensor, and T indicates a distance between the object side of the first lens and the image side of the prism.

2. The terminal device according to claim 1, wherein the vertical line of the light-transmitting area is perpendicular to the first board, and the optical axis of the lens group is perpendicular to the vertical line of the light-transmitting area.

3. The terminal device according to claim 1, wherein an optical factor Q of the first camera satisfies $0.5 \leq Q \leq 0.9$, wherein the optical factor Q is a ratio of a combined focal length f of the lens group to a body diagonal length H of the photosensitive sensor.

4. The terminal device according to claim 1, wherein the first camera further comprises a diaphragm, and an aperture factor F of the first camera satisfies $1.0 < F < 1.95$, wherein the aperture factor F is a ratio of a combined focal length f of the lens group to a clear aperture D of the diaphragm.

5. The terminal device according to claim 4, wherein the diaphragm is located in a light exit direction of the image side of the prism, and is located between the prism and a first lens, and the first lens is a lens closest to the prism in the lens group.

6. The terminal device according to claim 5, wherein there is a first distance T1 between the diaphragm and the first lens, and T1>0.

7. The terminal device according to claim 5, wherein a ratio of a first length L1 of the first camera to the combined focal length f of the lens group satisfies $(L1/f) \geq 1.05$, and wherein the first length L1 of the first camera is a distance from the diaphragm to the photosensitive sensor.

8. The terminal device according to claim 5, wherein the first lens comprises an object side protruded toward the image side of the prism; and the diaphragm is sleeved at an outer ring of the object side of the first lens.

9. The terminal device according to claim 8, wherein a ratio of a first length L1 of the first camera to the combined focal length f of the lens group satisfies $(L1/f) \geq 1.05$, and wherein the first length L1 of the first camera is a distance from the object side of the first lens to the photosensitive sensor.

10. The terminal device according to claim 8, wherein a distance T between the object side of the first lens and the image side of the prism satisfies $0.02 \text{ mm} \leq T \leq 1 \text{ mm}$.

11. A camera, comprising:

a prism, a lens group and a photosensitive sensor;

wherein the prism comprises an object side and an image side;

wherein light transmitting through the prism sequentially pass through the object side of the prism, the image side of the prism, and the lens group to irradiate onto the photosensitive sensor, a field of view of the light that the photosensitive sensor receives is within a preset value range, and an optical axis of the lens group is not parallel to an optical axis of the object side of the prism; and wherein the preset value range is greater than or equal to 55°, wherein a refractive index n1 of the prism satisfies $n \geq 1.7$, and wherein a first equivalent side length is equal to a second equivalent side length of the prism, which are both Y1, and the first equivalent side length Y1 satisfies $0.74Y \leq Y1 \leq 0.88Y$; wherein:

the first equivalent side length is a length of a projection of the object side of the prism on a straight line where the optical axis of the lens group is located, and the second equivalent side length is a length of the projection of the image side of the prism on the vertical line of the light-transmitting area; and $$Y = \left( \frac{Q \cdot H}{2F} + \frac{T}{2Q} \right) \cdot \frac{1}{1 - \frac{2X}{\sqrt{1-X^2}}},$$

wherein, $$X = \frac{1}{n1} \cdot \frac{1}{\sqrt{1+4Q^2}},$$

Q indicates an optical factor of the first camera, F indicates an aperture factor of the first camera, H indicates a body diagonal length of the photosensitive sensor, and T indicates a distance between the object side of the first lens and the image side of the prism.

12. The camera according to claim 11, wherein each optical axis of the lens group is perpendicular to the optical axis of the object side of the prism.

13. The camera according to claim 11, wherein an optical factor Q of the camera satisfies $0.5 \leq Q \leq 0.9$, wherein the optical factor Q is a ratio of a combined focal length f of the lens group to a body diagonal length H of the photosensitive sensor.

14. The camera according to claim 11, wherein the camera further comprises a diaphragm, and an aperture factor F of the camera satisfies $1.0 < F < 1.95$, wherein the aperture factor F is a ratio of a combined focal length f of the lens group to a clear aperture D of the diaphragm.

15. The camera according to claim 14, wherein the diaphragm is located in a light exit direction of the image side of the prism, and is located between the prism and a first lens, and the first lens is a lens closest to the prism in the lens group.

16. The camera according to claim 15, wherein there is a first distance T1 between the diaphragm and the first lens, and T1>0.

17. The camera according to claim 15, wherein a ratio of a first length L1 of the camera to the combined focal length f of the lens group satisfies $(L1/f) \geq 1.05$, and wherein the first length L1 of the camera is a distance from the diaphragm to the photosensitive sensor.

18. A photographing apparatus, comprising:

a camera, wherein the camera comprises a prism, a lens group and a photosensitive sensor;

wherein the prism comprises an object side and an image side;

wherein light transmitting through the prism sequentially pass through the object side of the prism, the image side of the prism, and the lens group to irradiate onto the photosensitive sensor, a field of view of light that the photosensitive sensor receives is within a preset value range, and an optical axis of the lens group is not parallel to an optical axis of the object side of the prism; and wherein the preset value range is greater than or equal to 55°, wherein a refractive index nl of the prism satisfies nl≥1.7, and wherein a first equivalent side length is equal to a second equivalent side length of the prism, which are both Y1, and the first equivalent side length Y1 satisfies 0.74Y≤Y1≤0.88Y; wherein:

the first equivalent side length is a length of a projection of the object side of the prism on a straight line where the optical axis of the lens group is located, and the second equivalent side length is a length of the projection of the image side of the prism on the vertical line of the light-transmitting area; and $$Y = \left( \frac{Q \cdot H}{2F} + \frac{T}{2Q} \right) \cdot \frac{1}{1 - \frac{2X}{\sqrt{1 - X^2}}},$$

wherein, $$X = \frac{1}{n1} \cdot \frac{1}{\sqrt{1 + 4Q^2}},$$

Q indicates an optical factor of the first camera, F indicates an aperture factor of the first camera, H indicates a body diagonal length of the photosensitive sensor, and T indicates a distance between the object side of the first lens and the image side of the prism.

\* \* \* \* \*